United States Patent
Rose

(10) Patent No.: US 7,437,472 B2
(45) Date of Patent: Oct. 14, 2008

(54) INTERACTIVE BROADBAND SERVER SYSTEM

(75) Inventor: Steven W. Rose, Haliimaile, HI (US)

(73) Assignee: Interactive Content Engines, LLC., Honolulu, HI (US)

( * ) Notice: Subject to any disclaimer, the term of this patent is extended or adjusted under 35 U.S.C. 154(b) by 672 days.

(21) Appl. No.: 10/304,378

(22) Filed: Nov. 26, 2002

(65) Prior Publication Data

US 2003/0115282 A1    Jun. 19, 2003

Related U.S. Application Data

(60) Provisional application No. 60/333,856, filed on Nov. 28, 2001.

(51) Int. Cl.
G06F 15/16    (2006.01)

(52) U.S. Cl. .................. 709/231; 709/217; 709/219

(58) Field of Classification Search .......... 709/219, 709/231, 233, 247
See application file for complete search history.

(56) References Cited

U.S. PATENT DOCUMENTS

| | | | |
|---|---|---|---|
| 4,349,875 A * | 9/1982 | Tada .................. | 711/135 |
| 5,410,343 A | 4/1995 | Coddington et al. | |
| 5,421,031 A | 5/1995 | De Bey | |
| 5,473,362 A | 12/1995 | Fitzgerald et al. | |
| 5,521,631 A | 5/1996 | Budow et al. | |
| 5,528,282 A | 6/1996 | Voeten et al. | |
| 5,550,577 A | 8/1996 | Verbiest et al. | |
| 5,581,735 A * | 12/1996 | Kajitani et al. .......... | 711/169 |
| 5,604,682 A * | 2/1997 | McLaughlin et al. ..... | 709/219 |
| 5,606,359 A | 2/1997 | Youden et al. | |
| 5,608,448 A | 3/1997 | Smoral et al. | |
| 5,625,405 A * | 4/1997 | DuLac et al. .......... | 725/92 |
| 5,671,377 A | 9/1997 | Bleidt et al. | |
| 5,678,061 A | 10/1997 | Mourad | |
| 5,712,976 A | 1/1998 | Falcon, Jr. et al. | |
| 5,721,815 A | 2/1998 | Ottesen et al. | |
| 5,732,239 A | 3/1998 | Tobagi et al. | |
| 5,790,794 A | 8/1998 | DuLac et al. | |

(Continued)

OTHER PUBLICATIONS

Van Tassel, Joan et al. NTQ New Telecom Quarterly, The Evolution of the Interactive Broadband Server, Parts 1 and 2, 1996, 28 pages.

(Continued)

*Primary Examiner*—John Follansbee
*Assistant Examiner*—Hassan Phillips
(74) *Attorney, Agent, or Firm*—Gary R Stanford

(57) ABSTRACT

An interactive broadband server system including multiple processors, a backbone switch, multiple storage devices and multiple user processes. The backbone switch enables high speed communication between the processors. The storage devices are distributed across the processors to store titles, where each title is divided into data chunks that are distributed across the storage devices. The user processes are configured for execution on the processors for interfacing multiple subscriber locations. Each user process is operative to retrieve a requested title from two or more of the processors via the backbone switch and to assemble a requested title for delivery to a requesting subscriber location. The storage devices may be organized into RAID groups. Distributed media readers and a library storage system may be included. Multiple isochronous titles may be simultaneously delivered to downstream subscribers. Titles may be preprocessed and stored in a predetermined format to reduce loading and processing overhead.

41 Claims, 12 Drawing Sheets

U.S. PATENT DOCUMENTS

| | | | |
|---|---|---|---|
| 5,805,804 | A | 9/1998 | Laursen et al. |
| 5,815,146 | A | 9/1998 | Youden et al. |
| 5,818,512 | A | 10/1998 | Fuller |
| 5,862,312 | A | 1/1999 | Mann et al. |
| 5,862,403 | A * | 1/1999 | Kanai et al. .................... 710/6 |
| 5,892,915 | A * | 4/1999 | Duso et al. .................... 725/93 |
| 5,996,089 | A | 11/1999 | Mann et al. |
| 6,005,599 | A * | 12/1999 | Asai et al. .................... 725/116 |
| 6,032,200 | A | 2/2000 | Lin |
| 6,049,823 | A | 4/2000 | Hwang |
| 6,070,186 | A * | 5/2000 | Nishio .................... 725/92 |
| 6,101,547 | A | 8/2000 | Mukherjee et al. |
| 6,128,467 | A * | 10/2000 | Rege .................... 725/115 |
| 6,134,596 | A | 10/2000 | Bolosky et al. |
| 6,182,128 | B1 * | 1/2001 | Kelkar et al. .................... 725/87 |
| 6,230,200 | B1 | 5/2001 | Forecast et al. |
| 6,266,817 | B1 | 7/2001 | Chadda |
| 6,275,898 | B1 | 8/2001 | DeKoning |
| 6,279,040 | B1 | 8/2001 | Ma et al. |
| 6,289,383 | B1 | 9/2001 | Rhine |
| 6,332,140 | B1 | 12/2001 | Rhine |
| 6,370,579 | B1 | 4/2002 | Partridge |
| 6,374,336 | B1 | 4/2002 | Peters et al. |
| 6,401,126 | B1 | 6/2002 | Doucer et al. |
| 6,415,373 | B1 * | 7/2002 | Peters et al. .................... 709/233 |
| 6,449,688 | B1 | 9/2002 | Peters et al. |
| 6,604,155 | B1 * | 8/2003 | Chong, Jr. .................... 709/231 |
| 6,898,285 | B1 * | 5/2005 | Hutchings et al. .................... 709/231 |
| 2002/0073172 | A1 * | 6/2002 | Armstrong et al. .................... 709/219 |
| 2002/0157113 | A1 * | 10/2002 | Allegrezza .................... 725/92 |
| 2003/0046704 | A1 * | 3/2003 | Laksono et al. .................... 725/96 |
| 2003/0088689 | A1 * | 5/2003 | Alexander et al. .................... 709/232 |

OTHER PUBLICATIONS

Rose, Steve; Video on Demand Playback Machine Investigation for ATC by Steve Rose, Viaduct Corp.; 1994; 18 pages.

Rose, Steve; Video on Demand Overview; 1994; 3 pages.

Rose, Steve ; Video on Demand: Current Status; 1994; 4 pages.

Santo, Brian; ATM may find use in video on demand; Electronic Engineering Times; 1994; p. 37; Maui, Hawaii.

Rose, Steve; Video on Demand and ATM—A Quick Overview; 1994; 2 pages.

CRC Electronics, Inc. / Model P-1000 / Videocassette Programmer (Pamphlet), CRC Electronics, Inc. / Model TD-100 / Time Delay Videotape Controller (Pamphlet), Capacity Plus (Pamphlet); 1994; 11 pages.

PCT Notification of Transmittal of the International Search Report or the Declaration; dated Apr. 10, 2003, 3 pages.

* cited by examiner

INTERACTIVE BROADBAND SERVER SYSTEM

CROSS-REFERENCE TO RELATED APPLICATION(S):

The present application is based on U.S. Provisional patent application entitled "Interactive Broadband Server System", Ser. No. 60/333,856, filed Nov. 28, 2001, which is hereby incorporated by reference in its entirety.

FIELD OF THE INVENTION

The present invention relates to interactive broadband server systems, and more particularly, to an interactive broadband server system that is capable of delivering may different kinds of data and services including a significantly high number of simultaneous isochronous data streams, such as could be used to deliver video on demand (VOD) services.

DESCRIPTION OF RELATED ART

An Interactive broadband server (IBS) system is a device that delivers many different kinds of data and provides many simultaneous services. Such services may include video streams from pre-recorded video (ranging from clips to spots to movies), video streams from near-real-time events, two-way voice data, data transport downloads, database interactions, support for credit card transactions, interactive simulations and games, delivery of multimedia content, and any other services known or to be determined. It is desired that the IBS system provide thousands of simultaneous isochronous data streams, where "isochronous" refers to data streams that are time-sensitive and must be delivered continuously without interruption since the streams would otherwise become incoherent. Examples of isochronous data streams include real-time video and audio which are transmitted as soon as they are received, such as a live television feed, training videos, movies, and individually requested advertising. The IBS system must also accurately track, account for, store and bill for all services while providing for network management. Other terms used to describe a fundamentally similar device include Video Server, Media Server, Interactive Broadband Server, Interactive Content Engine, Bandwidth Multiplier, and Metropolitan Media Server.

Attempts and proposals have been made to implement IBS systems including embodiments that feature one or more high capacity central servers to those that employ distributed processing systems. The challenge is to provide an IBS solution that is capable of delivering high quality services to thousands of users while maintaining a cost-effective and practical design. Traditional server designs are limited in the number of output streams that may be generated from one copy of a title. This requires redundant storage for popular titles, and advanced knowledge of which titles will be popular (once a title shows itself to be popular, there may be no bandwidth left to replicate it).

SUMMARY OF THE INVENTION

An interactive broadband server system according to an embodiment of the present invention includes a plurality of processors, a backbone switch, a plurality of storage devices and a plurality of user processes. The backbone switch enables high speed communication between the processors. The storage devices are coupled to and distributed across the processors to store at least one title, where each title is divided into data chunks that are distributed across two or more of the storage devices. The user processes are configured for execution on the processors for interfacing a plurality of subscriber locations. Each user process is operative to retrieve a requested title from two or more of the processors via the backbone switch and to assemble a requested title for delivery to a requesting subscriber location.

In one embodiment, the storage devices are organized into a plurality of RAID groups, where data chunks of each stored title are distributed across the RAID groups. In one configuration, for example, each data chunk is divided into a plurality of sub-chunks that are distributed across one of the RAID groups. In the RAID embodiments, RAID group retrieval and assembly functionality may be distributed among the user processes.

In another embodiment, an interactive broadband server system comprises a backbone switch including a plurality of bi-directional ports, a disk array, a plurality of processors, and a plurality of processes. The disk array comprises a plurality of disk drives and stores a plurality of titles which are subdivided into a plurality of data chunks. The data chunks are distributed across the disk array. Each processor has a plurality of interfaces, including a first interface coupled to a port of the backbone switch, a second interface coupled to at least one disk drive of the drive array, and a third interface for coupling to a network for interfacing a plurality of subscriber devices. The processes enable each processor to retrieve data chunks of a requested title from two or more of the processors, to assemble the requested title, and to transmit the requested title via the third interface.

Any type of content is contemplated for delivery to subscriber devices. In one embodiment, a plurality of titles each comprise isochronous data content simultaneously delivered to a corresponding plurality of subscriber devices via corresponding third interfaces of the processors.

The system may include a plurality of media readers, each coupled to a corresponding one of the processors, and a library storage system. In one embodiment, the processors include an additional interface for coupling to a media reader. The library storage system includes a plurality of storage media that collectively store a plurality of titles and is coupled to a port of the backbone switch. The library storage system is configured to receive a title request via the backbone switch and to load a corresponding storage media on any available one of the plurality of media readers.

The plurality of processes may include at least one loading process configured to retrieve a title from a media reader, to divide the title into data chunks, and to distribute the data chunks across the disk array via the processors. The loading process may create a title map that locates each data chunk of a title. The plurality of processes may further include at least one user process executed on a processor that retrieves and uses the title map to retrieve each data chunk of the title.

The titles may be preprocessed and stored in a predetermined format to reduce loading and processing overhead. Examples of preprocessing include pre-encryption, pre-calculated redundancy information, pre-stored transport protocol, pointers to specific locations within stored title content for a variety of reasons, etc. The pointers, for example, may comprise time stamps.

An interactive content engine according to an embodiment of the present invention includes a backbone switch including a plurality of ports, processors, media readers, a library storage system, storage devices, and at least one process executed on the processors. The at least one process collectively submits a title request, retrieves a requested title from an available media reader, stores the requested title on the storage devices, and delivers the requested title to one of the plurality of processors.

BRIEF DESCRIPTION OF THE DRAWINGS

For a more complete understanding of the present invention, reference is now made to the following description taken in conjunction with the accompanying drawings in which like reference numerals indicate like features and wherein.

DETAILED DESCRIPTION OF EMBODIMENTS OF THE INVENTION

An Interactive Broadband Server System according to an embodiment of the present invention overcomes the most objectionable characteristics of traditional servers by avoiding the necessity of redundant storage of content and the concomitant title by title proactive management of storage. Pre-knowledge of which titles will be most popular is not required, and a single copy of a title may serve any number of simultaneous users, each at a slightly different (and individually controlled) point in time in the title, up to the maximum stream output capacity of the server.

In embodiments described herein, the above-described capabilities are accomplished by striping "chunks" of each title over an array of disk drives, where each chunk represents a fixed amount of storage or a fixed amount of time. Each user process accessing a title is given the location of each chunk of the title, and is responsible for reassembling them into an independent and (in most cases) isochronous output stream. Each chunk is stored on a redundant array of independent disks (RAID) array, such as in five "sub-chunks", one sub-chunk per drive. These five sub-chunks contain 20% redundant information, allowing the reconstruction of any missing sub-chunk in the case of a drive or processor failure. This approach allows all output streams to be generated from one title, or each output stream to be generated from a different title, and results in a remarkably evenly distributed load on all processors and a backbone (or backplane) switch. Management is automatic and prior knowledge of content popularity is not required. When a new title is requested from the library, the least recently used (LRU) title in hard drive storage is deleted to make room. Each sub-chunk is similarly cached in the memory of the processor on which it is stored, until it becomes the least recently used sub-chunk and is deleted to make room for a currently requested one. Allocation of server resources is automatic and based on instantaneous demand.

Figure 1:
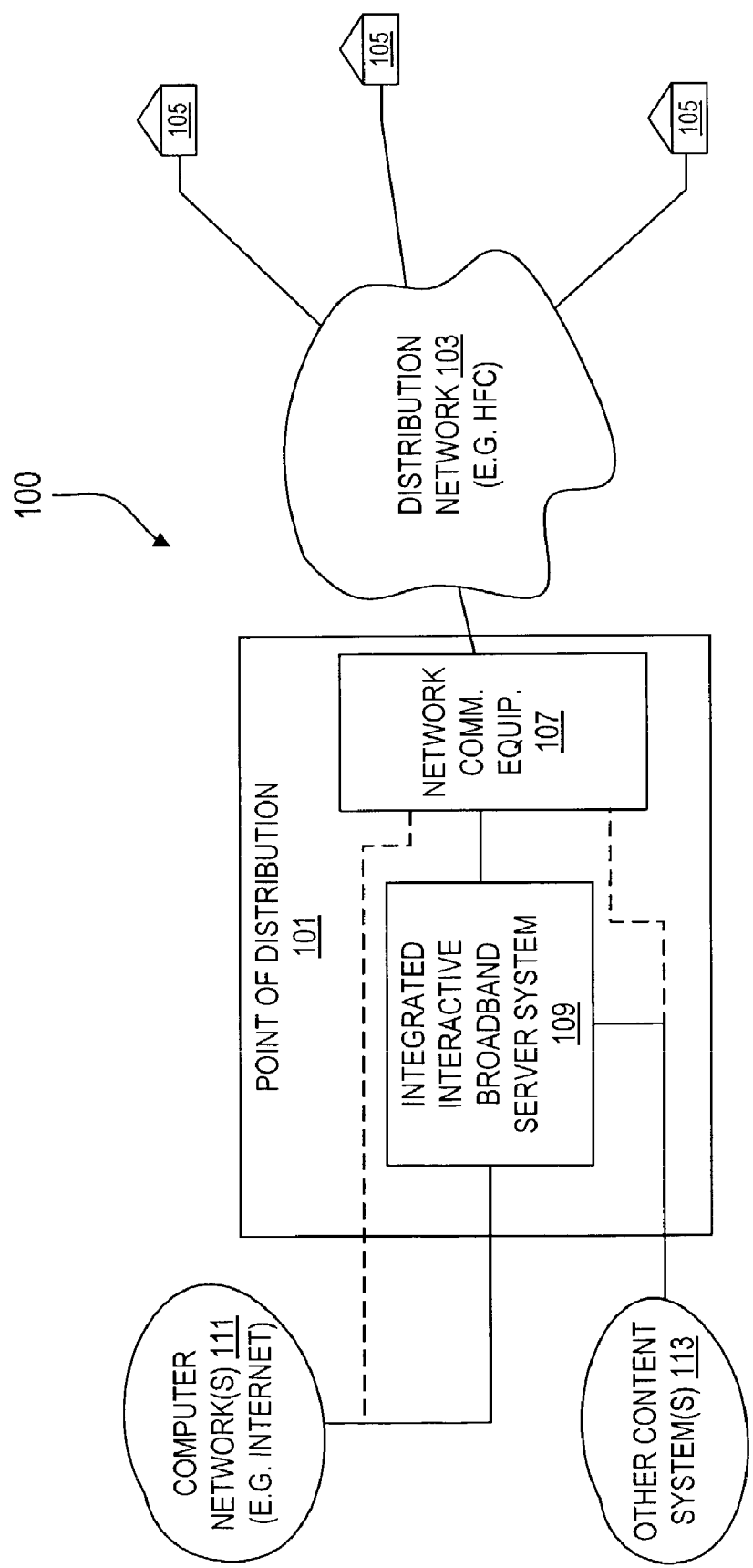
FIG. 1 is a simplified block diagram of a communication system including an interactive broadband server (IBS) system configured according to an embodiment of the present invention.

FIG. 1 is a simplified block diagram of a communication system 100 including an interactive broadband server (IBS) system 109 configured according to an embodiment of the present invention. The IBS system 109 is located at a convenient and exemplary point of distribution 101 and is coupled via a network communication system 107 and an exemplary distribution network 103 for distributing data and services to one or more subscriber locations 105. As described further below, the IBS system 109 incorporates a library storage system 201 (FIG. 2) incorporating stored (and typically encoded, encrypted and/or compressed) content for delivery to the subscriber locations 105. Bi-directional communication is supported in which subscriber information from any one or more of the subscriber locations 105 is forwarded upstream to the point of distribution 101. The network communication system 107 may be any type of data network which supports the transmission of isochronous data, such as an Asynchronous Transfer Mode (ATM) or Ethernet network, or a wireless, Digital Subscriber Line (DSL) or hybrid fiber coax (HFC) network which modulates data for downstream transport to the subscriber locations 105 and tunes to upstream channels for receiving and demodulating subscriber information.

Many different types of information sources are contemplated, such as one or more computer networks 111 (e.g., the Internet), or other content systems 113, which represents any combination of telephonic information, satellite communication systems, off-air antenna systems 116 (e.g. microwave tower), etc. The computer networks 111 may include any type of local area network (LAN), wide area network (WAN) or global computer network, such as including the Internet or the like. The other content systems 113 may include the public switched telephone network (PSTN) and/or may be employed for reception and delivery of any type of information, such as television broadcast content or the like. The computer networks 111 and/or the other content systems 113 may be local to the point of distribution 101 (e.g. operating as a headend or the like) or may be located upstream and delivered via appropriate data transport mechanisms, such as fiber optic links or the like. Depending upon the particular configuration, the computer networks 111 and/or the other content systems 113 may each be coupled directly to the network communication system 107 or coupled via the IBS system 109 for delivery to the subscriber locations 105. The point of distribution 101 may include appropriate equipment for data transmission, such as, for example, internal servers, firewalls, Internet Protocol (IP) routers, signal combiners, channel re-mappers, etc.

The particular configuration of the network communication system 107 and the distribution network 103 depends on the specific architecture and technology employed. In one embodiment, the distribution network 103 is configured according to an HFC network in which the subscriber media includes coaxial cables that are distributed from local nodes (e.g., optical nodes or the like which provide conversion between optical and electrical formats) to the respective subscriber locations 105. In an HFC configuration, source information is distributed from a headend to each of several distribution hubs, which further distributes source information to one or more optical nodes or the like, which in turn distributes the source information to one or more subscriber locations 105 via corresponding subscriber media links, such as coaxial cables. In such configuration, the point of distribution 101 may represent any one of the headend, the distribution hubs or the optical nodes. Each point of distribution supports a successively smaller geographic area. A headend, for example, may support a relatively large geographic area, such as an entire metropolitan area or the like, which is further divided into smaller areas, each supported by a distribution hub. The area supported by each distribution hub is further divided into smaller areas, such as neighborhoods within the metropolitan area, each supported by a corresponding optical node.

Optical links may be employed, such as, for example, SONET (Synchronous Optical Network) rings or the like. It is understood that any known or future developed media is contemplated for each communication link in the network. In an HFC embodiment, for example, each optical node receives an optical signal from an upstream point of distribution, converts the optical signal to a combined electrical signal and distributes the combined electrical signal over a coaxial cable to each of several subscriber locations 105 of a corresponding geographic serving area. Subscriber information is forwarded in electrical format (e.g., radio frequency (RF) signals) and combined at each optical node, which forwards a combined optical signal upstream to a corresponding distribution hub.

Each subscriber location 105 includes customer premises equipment (CPE) (not shown), such as set-top boxes or cable modems or DSL modems or the like that tune, decode, and de-modulate source information from a combined electrical signal intended for the particular subscriber location 105. The CPE at each subscriber location 105 may include a modulating device or the like that encodes, modulates and up converts subscriber information into RF signals or the like. The upstream RF signals from each of the subscriber locations 105 are transmitted on a suitable subscriber medium (or media) to a corresponding node, which converts the subscriber signals to an optical signal. For example, a laser may be used to convert the return signal to an optical signal and send the optical return signal to an optical receiver at a distribution hub over another fiber optic cable.

Other broadband network environments are contemplated, such as any of the broadband network technologies developed by the cable and telephone industries. An example is Asymmetrical Digital Subscriber Line (ADSL) technology that trades reduced upstream bandwidth for greater downstream bandwidth. The telephone industry Fiber-to-the-Curb (FITC) architecture is contemplated, as well as various wireless infrastructures including multi-channel, multipoint distribution service (MMDS) or local multipoint distribution service (LMDS) using a cellular approach.

The source and subscriber information may include any combination of video, audio or other data signals and the like, which may be in any of many different formats. The source information may originate as fixed- or variable-size frames, packets or cells, such as Internet protocol (IP) packets, Ethernet frames, ATM cells, etc., as provided to the distribution hubs. Digital video compression techniques are contemplated, such as discrete cosine transform (DCT) and the family of standards developed by the Moving Pictures Experts Group (MPEG), such as MPEG-1, MPEG-2, MPEG-4, etc. The MPEG-2 standard, for example, supports a wide variety of audio/video formats, including legacy TV, High Definition TV (HDTV) and five-channel surround sound. MPEG-2 provides broadcast-quality resolution that is used in DVD (Digital Versatile Disc or Digital Video Disc) movies, and requires from 4 to 20 megabits per second (Mbps) bandwidth depending upon the desired quality of services (QoS). The transmitted data and information may include one or more destination addresses or the like indicating any one or more specific subscriber devices at the subscriber locations 105. The CPE at each subscriber location 105 includes the appropriate communication equipment to receive and demodulate received information, and decode address information to deliver the original content intended for the subscriber. Upstream subscriber information may be handled in a similar manner.

Figure 2A:
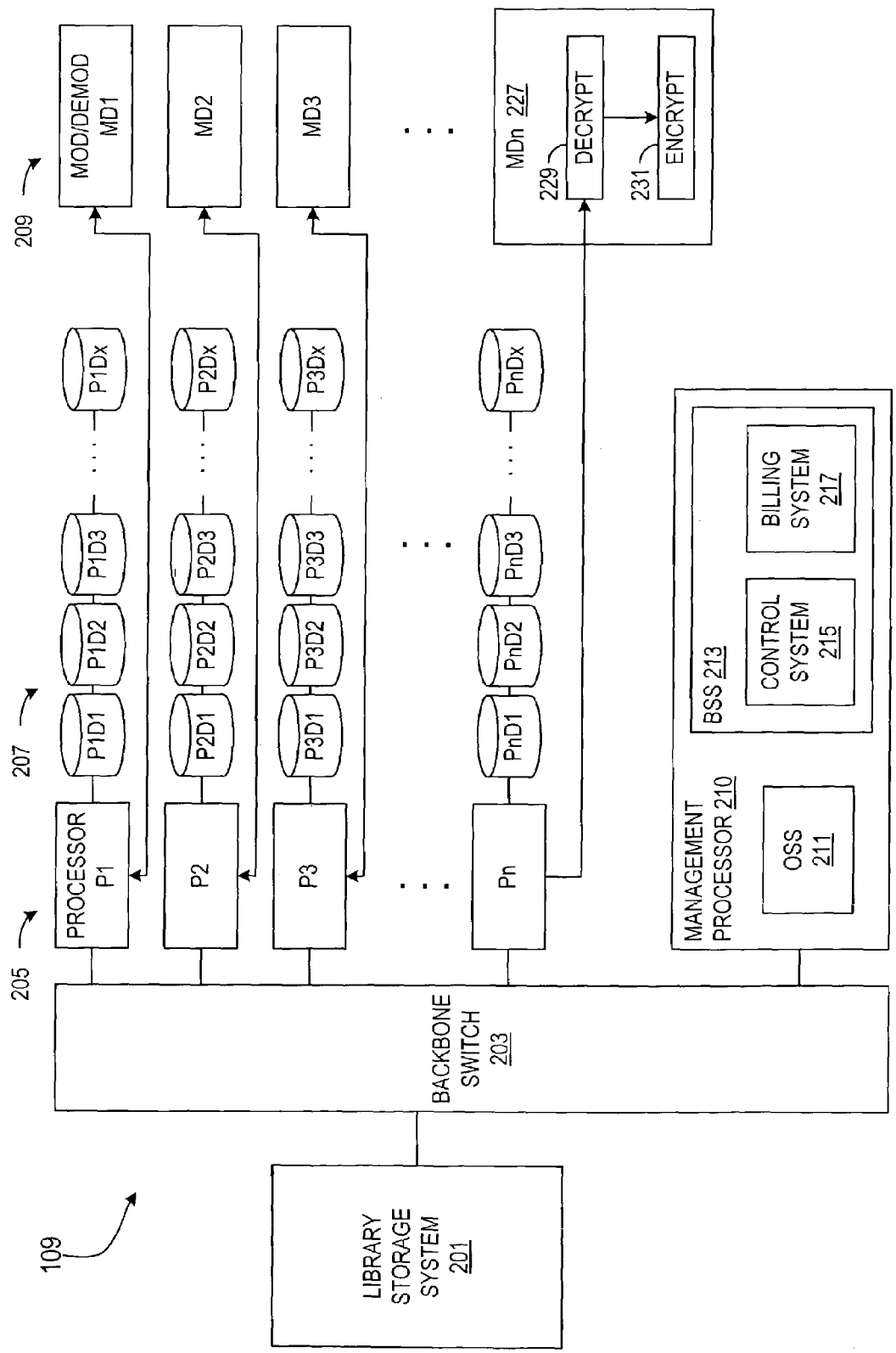
FIG. 2A is a block diagram of an exemplary embodiment of the IBS system of FIG. 1.

FIG. 2A is a block diagram of an exemplary embodiment of the IBS system 109. The IBS system 109 includes the library storage system 201 coupled to a backbone or backplane switch 203, which is further coupled to each of a series of processors 205, individually labeled P1, P2, . . . , Pn, where "n" is a positive integer. Each processor 205 includes one or more hard disk drives configured as a disk array 207, and each processor 205 is further coupled to a corresponding one of a series of modulators/demodulators (MOD/DEMOD) 209, individually labeled MD1, MD2, . . . , MDn. A management processor 210 including an Operations Support System (OSS) 211 and a Business Support System (BSS) 213 is also shown coupled to the backbone switch 203. It is noted, however, that the management processor 210 is optional and that the management functions, including the OSS 211 and the BSS 213 may be distributed among the processors 205.

The disk array 207 are individually labeled PaDb, where "a" refers to the processor number and "b" refers to a disk number, which varies from 1 to "x". The number "x" is a positive integer denoting a number of disk drives per processor for the disk array 207. In one exemplary configuration, n is 100, x is 8 so that there is 100 processors 205 and a total of n by x=800 disk drives. As described further below, the disk array 207 is further configured into multiple RAIDs for distributing groups or chunks of data among multiple processors 205 and multiple disk drives. The MOD/DEMODs 209 may be incorporated within the network communication system 107, where each operates to modulate data and information from respective processor 205 for downstream delivery of data to corresponding subscriber locations 105 and to demodulate upstream subscriber data and information for use by the respective processor 205.

The library storage system 201 may be configured in any one of a variety of ways and its particular configuration and operation is beyond the scope of the present disclosure. In general, each processor 205 is configured to submit a request for a "title" (e.g. video, movie, etc.) or a request for other content to the library storage system 201 via the backbone switch 203, and the library storage system 201 responds by forwarding the requested data or by accessing media incorporating the requested title, such as by loading a corresponding optical disk (e.g., DVD) or tape cartridge or the like. In one embodiment, the loaded data and information is forwarded to the requesting processor 205 via the backbone switch 203. As described further below, the library storage system 201 loads optical disks onto any selected or available one of a plurality of optical disk drives distributed among the processors 205. The format and rate of the data provided depends upon the specific library and data storage configuration. The data rate for video applications may range from 1 Mbps (for VHS video quality) to about 10 Mbps (for DVD quality) or more. The particular format of the data may also vary depending upon the type of data or application. Audio/video data in MPEG-2 format is contemplated for movies and the like, delivered as groups of pictures (GOP) in the form of I, P and B MPEG frames delivered in bit-stream format. Of course, other types of data are contemplated, including isochronous data of any bit-rate and non-isochronous data from files of various sizes, such as Internet Protocol (IP) packets used for communication on the Internet via a computer network 111.

In one configuration suitable for delivery of video and/or multimedia information, such as a video on demand (VOD) system or the like, the library storage system 201 includes a stack or library of DVD disks and/or tape cartridges that may be further configured in a robotic-based disk access system. For a VOD-based application, the library storage system 201 should include at least an equivalent number of titles as the video rental business and be adaptable to add new titles as they become available. In a Television On Demand application, the number of titles may be in the hundreds of thousands. Many titles will be infrequently requested and thus are stored in the automated library storage system 201, which is configured to deliver any title in an expedient manner upon request.

Robotic storage libraries have been developed for the computer industry, ranging in size from jukebox systems that hold a few hundred optical disks to room-sized robots that hold thousands of tape cartridges and optical disks. These libraries have traditionally been characterized as off-line due to overall operating speed. In contrast, in at least one exemplary configuration, the library storage system 201 is designed to offer no more than a 30 second latency from request to delivery, in part by incorporating media readers and read/write devices distributed among the processors 205. Mechanical components of the library storage system 201 are configured for redundant access to all discs, so that only one copy of a title is required in the library storage system 201, and the most likely mechanical failures do not block access to any title. Because the library storage system 201 is considered to be the primary storage (any title in the library is available to any user at any time), the storage of the disk array 207 of the IBS system 109 is considered to be a cache for recently requested titles. As a result, IBS system 109 may be configured as a high stream capacity centralized server, or as a centralized Library with distributed caching in smaller local areas, based on the economics of each system in which it is deployed.

The backbone switch 203 includes a plurality of ports, each for interfacing one of the processors 205, one for the management processor 210, if provided, and one or more for interfacing the library storage system 201. Additional or spare ports may be used for various purposes, such as, for example, one or more standby computers for replacing any of the processors 205 in the event of failure, malfunction, maintenance, upgrades, etc. In one embodiment, the backbone switch 203 is configured according to the Ethernet standard and includes a sufficient number of ports for coupling the processors 205, 210 and the library storage system 201. Off-the-shelf products are available, such as the chassis-based "Bigiron" family of products manufactured by Foundary Networks. One Bigiron product includes at least 110 ports where each bidirectional port is capable of 1 Gbps data rate in each direction for 2 Gbps full duplex operation. In this manner, each processor 205 may receive up to 1 Gbps data from other processor or storage units for reassembly into output streams for users connected to that processor, or for storage on the local disk drives. Each processor 205 is connected to one port of the backbone switch 203, so that each of the 100 processors P1-P100 may simultaneously receive up to 1 Gbps of data.

In one embodiment, the library storage system 201 is connected to multiple ports of the backbone switch 203, so that each processor 205 receives data from the library storage system 201 and from other processors. In this manner, data from requested titles from the library storage system 201 is forwarded from the library storage system 201 by the backbone switch 203. Alternatively, as described more fully below, the library storage system 201 is connected to one port primarily for receiving title requests. In this configuration, data that is specifically requested by (user processes on) the target processor is received from optical drives or the like connected to the other processors. The data may include data that is to be stored on drives connected to the target processor coming from loading processes running on other processors. It is noted that the particular size and total data output capacity of the IBS system 109 as reflected in the number of processor/storage units (processors P1-P100) and the size of the backbone switch may be scaled based on the number of subscriber locations 105 supported and expected level of content demanded over time and including peak demand periods. Also, 1-Gbps port rate is exemplary only and other data rates are contemplated, such as 2.5, 4, 10, 40 or more Gbps ports.

The OSS 211 executes network monitoring and management software and processes standard management information. The OSS 211 enables an operator to flag error conditions and access and control operation of the IBS system 109 to resolve problems. In one configuration, the OSS 211 is remotely accessible. If and when an error occurs, the remotely accessible OSS 211 enables remote diagnosis and solution. Such remote access avoids the necessity for an operator to go to the physical premises of the point of distribution 101, which is otherwise inconvenient, time-consuming and potentially very costly in terms of subscriber satisfaction or service interruption. Remote access is enabled by a connection to an external network, such as a global network or the like (e.g., the Internet). If provided, the management processor 210 is coupled to an external computer network 111 and accessible via remote control software to enable remote operation of the management system. Alternatively, an external network connection is made through one or more ports of the backbone switch 203.

The BSS 213 includes a control system 215 and a billing system 217. The control system 215 manages content and directs normal operation of the IBS system 109 and directs the operation of the processors 205 and the backbone switch 203. Billing information is sent from the control system 215 to the billing system 217. Each of the processors 205 includes a software agent or application that monitors and tracks billing information for each subscriber location 105 based on a predetermined billing arrangement. The BSS 213 collects the billing information and enables complex forms of billing as desired. For example, a flat fee with fixed monthly additions for additional services plus individual billing for separate events is contemplated. A telephone billing arrangement may include a flat monthly charge plus billing on the basis of utilization on an incremental basis (e.g., minute-by-minute or second-by-second) plus billing on behalf of secondary companies (e.g., long distance providers). Telemarketing services require immediate credit verification and real-time interaction with financial and fulfillment (inventory and shipping) systems. The BSS 213 enables monitoring and tracking of sales of associated businesses to enable billing on a percentage of revenue basis for virtual shopping centers or the like. These and other complex billing models are contemplated and supported by the BSS 213.

It is noted that the OSS and BSS functionality may be provided by the IBS system 109, either by adding dedicated processors (e.g., the management processor 210), or by running the processes in a distributed manner on the existing processors 205. The IBS is designed to be very reliable, taking full advantage of its implicit redundancy, and has excess processing capacity, so it is appropriate for running processes that demand high reliability.

Many of the titles stored in and sourced from the library storage system may be proprietary or otherwise include copyrighted information. In one embodiment, much of the title data may be pre-encrypted and remain encrypted while being processed through the IBS system 109 all the way to the subscriber locations 105. CPE at each subscriber location 105 includes the appropriate decryption functions for decrypting the data for display or performance. Such configuration involves encryption on a title-by-title basis. It may be required that the title data be encrypted on a stream-by-stream basis so that each independent stream of data to each subscriber location 105 be separately encrypted even for the same title. For example, a given title distributed to one subscriber location 105 is separately encrypted with respect to the same title distributed in encrypted form to a different subscriber location 105 (or even the same subscriber at a subsequent time). The MOD/DEMOD 209 shown as MDn 227, illustrates an embodiment that enables stream-by-stream encryption. Each title is still encrypted while being processed through the IBS system 109 from the library storage system 201 to the MOD/DEMODs 209. In this case, each MOD/DEMOD 209 includes a decryption function 229 for decrypting each title within each MOD/DEMOD 209. The data is then delivered to an encryption function 231 for re-encrypting the data for delivery to the corresponding subscriber location 105. It is noted that even if similar encryption techniques are employed, separate and unique encryption keys may be employed so that the data is uniquely encrypted for each separate stream.

Figure 2B:
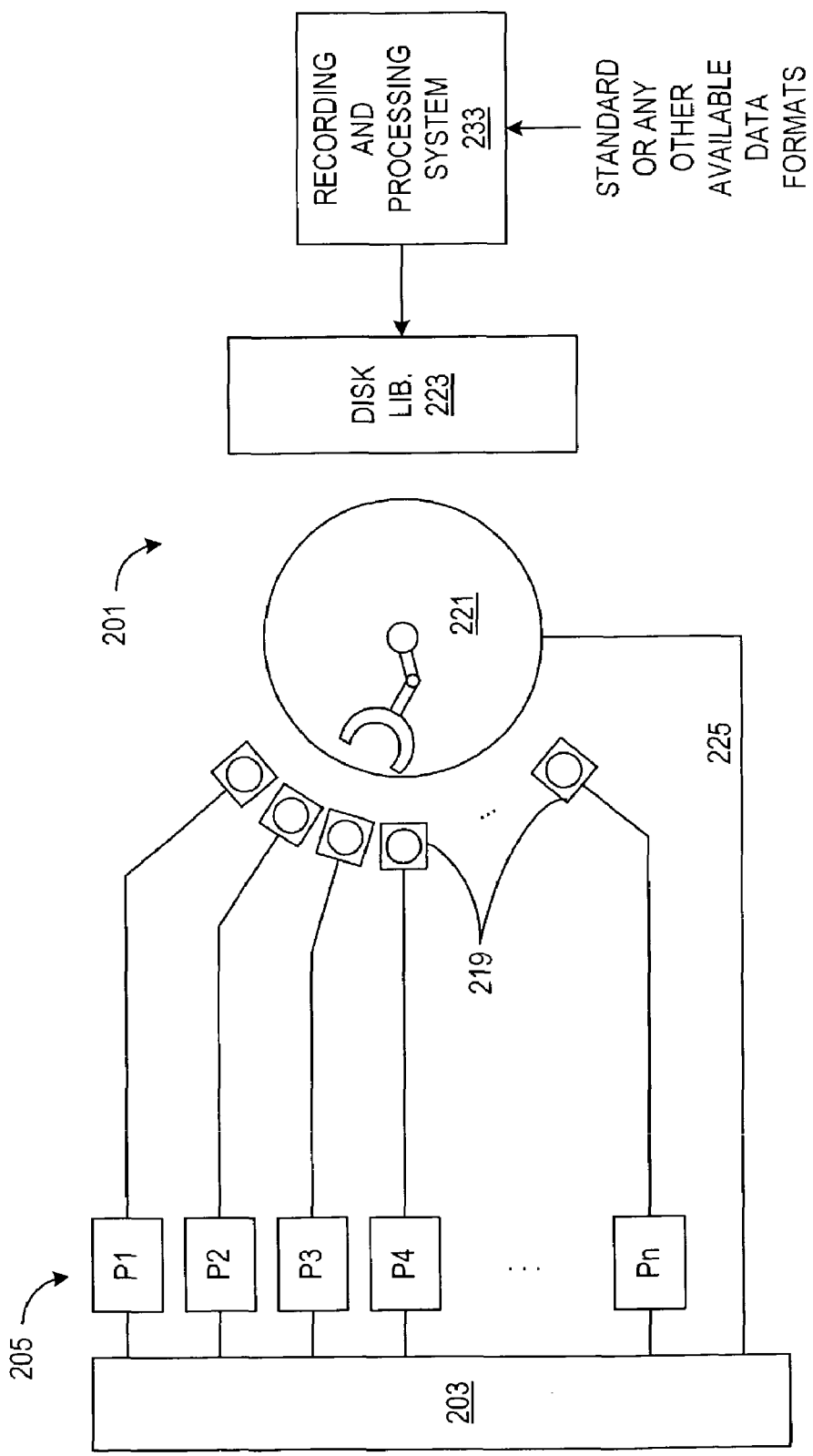
FIG. 2B is a block diagram of a portion of another exemplary embodiment of the IBS system of FIG. 1 employing optical disk drives distributed among the processors of FIG. 2A.

FIG. 2B is a block diagram of a portion of another exemplary embodiment of the IBS system 109 employing optical disk drives 219 distributed among the processors 205. In this case, each of the optical disk drives 219, such as a DVD drive or any other type of media reader, is connected to a corresponding one of the processors 205. The optical disk drives 219 are also physically located adjacent the library storage system 201 for access by an optical disk loading system 221. The library storage system 201 also includes an optical disk library 223 accessible to the optical disk loading system 223, where the optical disk library 223 stores a plurality of titles and any other content for distribution.

The optical disk loading system 221 may comprise a robotic-based loading system or the like that includes an internal processor or control circuitry (not shown) coupled to the backbone switch 203 via at least one communication link 225 for interfacing any of the processors 205. In this manner, any processor 205 submits a request for a title to the optical disk loading system 221, which retrieves a corresponding one or more disks from the optical disk library 223 and loads the retrieved disks on any selected or available ones of the optical disk drives 219. It is appreciated that the distributed nature of the IBS system 109 enables any of the processors 205 to access data from a disk loaded onto any of the optical disk drives 223. Such distributed configuration allows the optical disk loading system 221 to load disks according to any sequential or random selection process and avoids loading or distribution latency. The relatively large size of the storage of the disk array 207 results in a significant chance that a requested title is stored in the disk array 207, so that there is a relaxed bandwidth requirement between the library storage system 201 and the disk array 207. The distributed optical disk drive embodiment has sufficient bandwidth to handle title requests.

Titles stored in the library storage system 201 may be stored in a proprietary format that may include several enhancements for fast loading with low processing overhead. The content may be pre-encrypted, with RAID redundancy pre-calculated and stored, with transport protocol already applied to the resulting streams, and with pointers to specific locations within the content (for example, time stamps, transport headers) that may require further processing, or that may be required for further processing (e.g. groups of pictures (MPEG-2 GOPs) for fast forward, rewind, and splicing one stream to the next). As a result, a title may be loaded from the library storage system 201 at a speed exceeding fast forward, so that almost all modes of operation may be offered to even the first user of a title, and so that the loading processes impose as little processing overhead as possible. A recording and processing system 233 may be provided for converting data in standard or any other available formats (e.g., MPEG, DVD, etc.) into the desired proprietary format described above for storage on optical media in the optical disk library 223.

Figure 3:
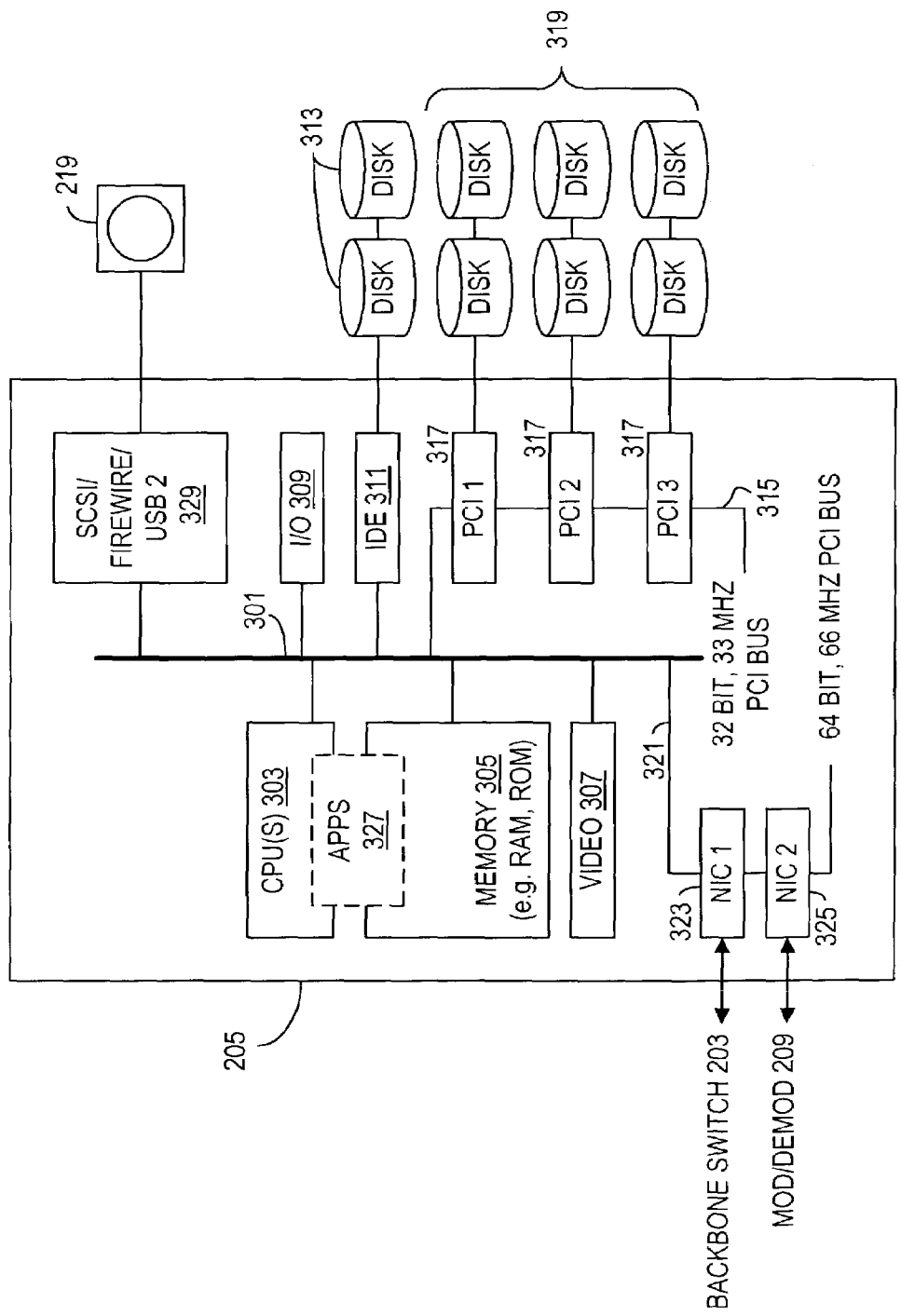
FIG. 3 is a block diagram of an exemplary embodiment of each of the processors of FIG. 2.

FIG. 3 is a block diagram of an exemplary embodiment of each of the processors 205. The exemplary configuration of the IBS system 109 shown in FIG. 2 illustrates a massively interconnected processor array (MIPA) configuration in which each of the processors 205 are configured in a substantially similar manner. In this manner, instead of a single or a small number of complex or high cost server systems, a large number of relatively simple low-end and low-cost computer systems may be employed. Each processor 205 may be implemented using relatively standard desktop or server personal computer (PC) system components or the like.

Each processor 205 includes a relatively standard bus structure or system 301 coupled to one or more central processing units (CPUs) 303, a memory system 305 including any combination of random access memory (RAM) and read-only memory (ROM) devices, an optional video interface 307 for interfacing a display, and one or more Input/Output (I/O) interfaces for interfacing corresponding I/O devices, such as a keyboard and mouse or the like. The bus system 301 may include multiple buses, such as at least one host bus, one or more peripheral buses, one or more expansion buses, etc., each supported by bridge circuits or controllers as known to those skilled in the art. The bus system 301 is also coupled to an Integrated Drive Electronics (IDE) controller 311 for coupling to typically two IDE disk drives 313, such as Disk 1 and Disk 2 (PaD1, PaD2) of the disk array 207 for a given processor Pa. The bus system 301 includes or otherwise interfaces one or more Peripheral Component Interconnect (PCI) buses, such as a 32 bit, 33 megahertz (MHz) PCI bus 315. The PCI bus 315 is coupled to three PCI disk drive controllers 317 (shown as PCI 1, PCI 2 and PCI 3), each for interfacing at least two PCI disk drives 319. The PCI disk drives 319 are shown implementing Disks 3-8 (PaD3-PaD8) of the processor Pa. The bus system 301 is also coupled to a high speed disk controller 329, such as a Small Computer System Interface (SCSI) adapter, a Firewire controller, a Universal Serial Bus version 2.0 (USB 2) controller, etc., for interfacing a corresponding one or more of the distributed optical disk drives 219.

The bus system 301 is also coupled to another PCI bus 321, which is a 64 bit, 66 MHz PCI bus in the embodiment shown. The PCI bus 321 interfaces at least two 1-Gbps Ethernet network interface cards (NICs) 323 and 325, for interfacing the backplane switch 203 and a corresponding one of the MOD/DEMODs 209, respectively. It is noted that a 64 bit, 66 MHz PCI bus is capable of a raw data throughput of over 4 Gbps, so that it is sufficient for handling the full duplex data throughput of the two 2-Gbps full duplex NICs 323, 325. Also shown is a software application block ("APPS") 327 representing one or more application programs or the like loaded into the memory 305 and executed by the CPU 303 for performing the functions and processes of the processor 205 as described further below. For example, a user process may be executed for managing each user supported by the particular processor 205. Also, other programs are included for detecting title requests from subscriber locations 105 via the NIC 325, forwarding each title request to the library storage system 201 via the NIC 323, receiving partial title data for processing and storage in the disk drives 313, 319 via the NIC 323, retrieval of title data from the disk drives 313, 319 into memory 305, processing of title data, and delivery of data to a requesting subscriber location 105 via the NIC 325. Of course, many other processing and functions may be defined for implementing the IBS system 109, such as billing applications, management applications, error detecting and correcting code (ECC) for RAID data storage, etc.

Each processor 205 may be configured with any suitable proprietary or public domain operating system (OS), such as a selected OS from among the Microsoft Windows family of operating systems or suitable versions and configurations of Linux. In one embodiment, a combination of Linux OS along with Real Time (RT) Linux is contemplated. Real Time Operating Systems (RTOS), Real Time Application Interface (RTAI) and Real Time Network (RT Net) are contemplated for handling real-time or isochronous operations directly and via networks for enabling real-time response. Various protocols and interfaces may be employed, such as Lightweight Directory Access Protocol (LDAP) for file structuring, Real Time Transport (RTS), Real Time Streaming Protocol (RTSP), Message Passing Interface (MPI), etc. A cluster configuration with a Cluster Message Passing (MP) layer is contemplated for executing billing, user interface and management operations.

Figure 4:
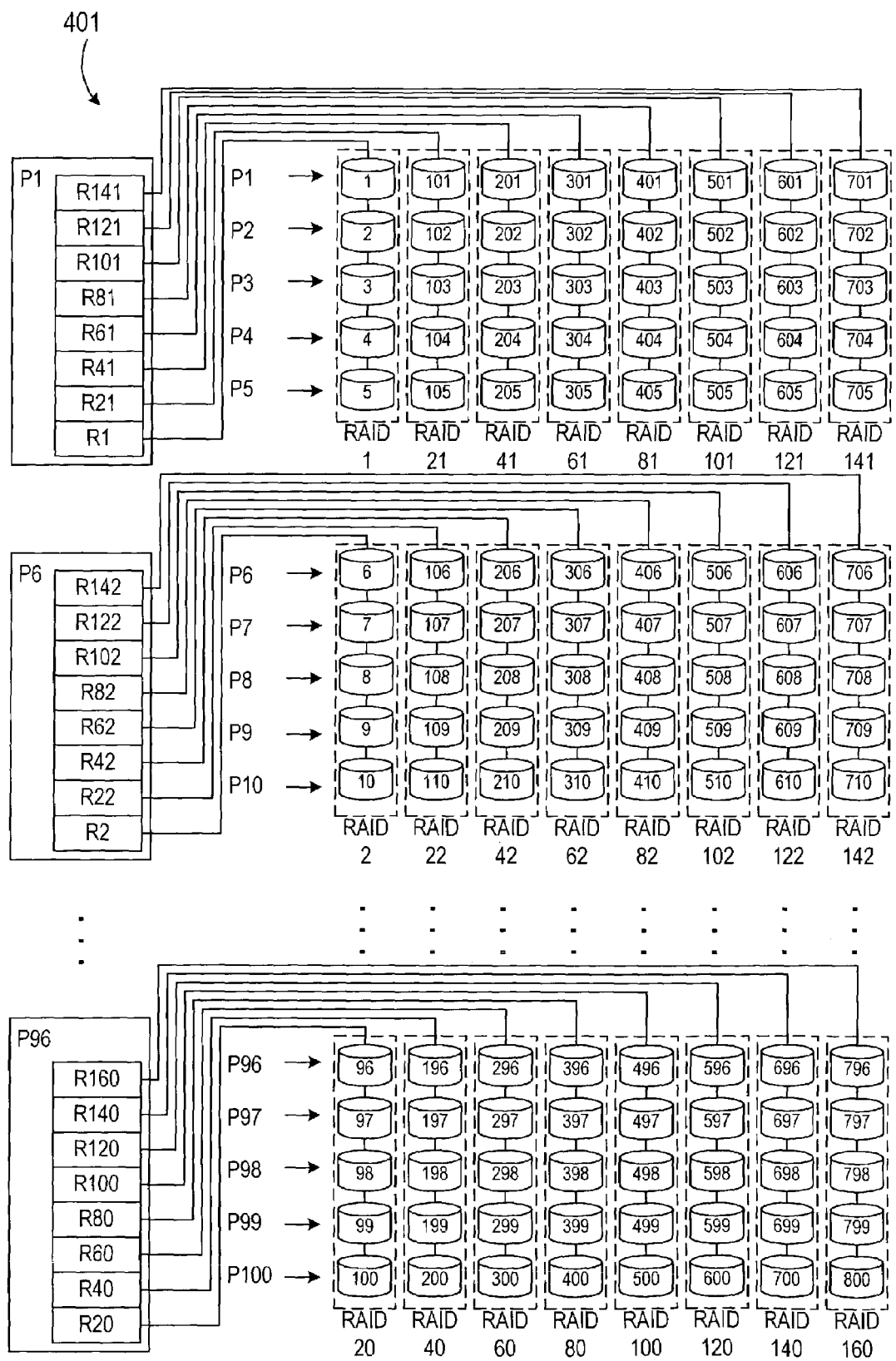
FIG. 4 is a block diagram illustrating an exemplary RAID disk organization in accordance with an embodiment of the present invention.

FIG. 4 is a block diagram illustrating an exemplary organization of the disk array 207 into a RAID disk organization 401 in accordance with one embodiment of the present invention. In this exemplary configuration, there are 100 processors with 8 drives each for a total of 800 disk drives numbered 1-800. The first disk D1 of the first processor P1 (or disk drive P1D1) is numbered as the first disk drive 1, the first disk D1 of the second processor P2 (or disk drive P2D1) is numbered as the second disk drive 2, and so on so that the first disk drive of each of the processors P1-P100 form the disk drives 1-100. The next disk drive 101 is the second disk drive of the first processor P1, the next disk drive 102 is the second disk drive of the second processor P2 and so on. In this manner, the 8 disk drives of the first processor P1 are numbered 1, 101, 201, 301, 401, 501, 601 and 701, respectively. The 8 disk drives of the second processor P2 are numbered 2, 102, 202, 302, 402, 502, 602 and 702, respectively, and so on. The disk drives 1-800 are organized into RAIDs of 5 disk drives each for a total of 160 RAIDs, where the first RAID 1 is formed by disk drives 1-5, the second RAID 2 is formed by disk drives 6-10 and so on until the last RAID 160 is formed by the disk drives 796-800.

Each RAID may be managed or controlled by a RAID controller, which is frequently implemented by a separate processor or a software processor or any other known configuration. In the embodiment shown and described herein, however, each RAID group exists only conceptually so that there is no associated RAID controller. Instead, RAID control functionality and operation is distributed among the processors 205. When content is loaded, a loading process, such as the loading process (LP) 509 (FIG. 5), receives a list of available storage locations from a directory process (DP) 505. It then takes the content, which has the RAID information pre-calculated and stored, and distributes it to the list of locations provided by the DP 505. Different loading processes may be storing content into the same RAID group simultaneously. By the same token, a user process, such as a user process (UP) 503, which is reading a title is requesting sub-chunks as listed in the directory entry for that title, then doing any necessary calculations to recreate a missing sub-chunk. If the management system is notified that a failed drive has been replaced, it launches a rebuild process on a lightly loaded or spare processor, which does not have to be directly controlling any of the affected drives.

Each RAID is illustrated as Rj, where "j" is a RAID index from 1 to 160. In this manner, there are 160 RAID groups labeled R1-R160, each controlled by multiple software processes which may be executing throughout the array of processors 1-100. Each RAID group may comprise any combination of hardware, logic and processing, where processing may be incorporated in other processes described further below, such as user processes, retrieval processes, loading processes, etc. Because of this, it would be possible to organize RAID groups on single drive boundaries rather than five drive boundaries, but the exemplary embodiments illustrated herein are shown with five drive boundaries for conceptual simplicity.

It is appreciated that that the RAID organizations illustrated or otherwise described herein are exemplary only and that many different RAID configurations are possible and contemplated. RAID sets may be overlapped or wrapped around in any desired manner. Also, it is possible that multiple processors 205 include a given RAID process for even greater processor distribution. Of course, each RAID may include any number of disk drives (less than or greater than 5) and each RAID may be controlled by a processor associated with any of the processors and not necessarily only one processor such as the processor associated with the first disk drive. It is nonetheless desired that each RAID group include only one disk drive of a given processor to maximize data distribution among processors. This insures that the failure of a processor 205 removes only one drive from each of the RAID groups in which it participates, which will not interrupt their operation. If all of the processes on the failed processor 205 are shadowed, as explained below, operation of the entire IBS system 109 continues without impediment. If the processes are not shadowed, there is a graceful degradation of the capabilities of the IBS system 109, directly affecting only the clients connected to the failed processor. If the IBS system 109 has been configured with a "hot standby" processor, it immediately begins to rebuild itself in the image of the failed processor.

As described further below, the RAID configurations enable data streams to be subdivided into data chunks that are further subdivided and distributed or striped among the disk drives of the RAIDs. For example, a data chunk is processed to include redundant information (using ECC or the like), and the resulting processed data chunk is subdivided into five sub-chunks and distributed to each of the five disk drives in a RAID.

Figure 5A:
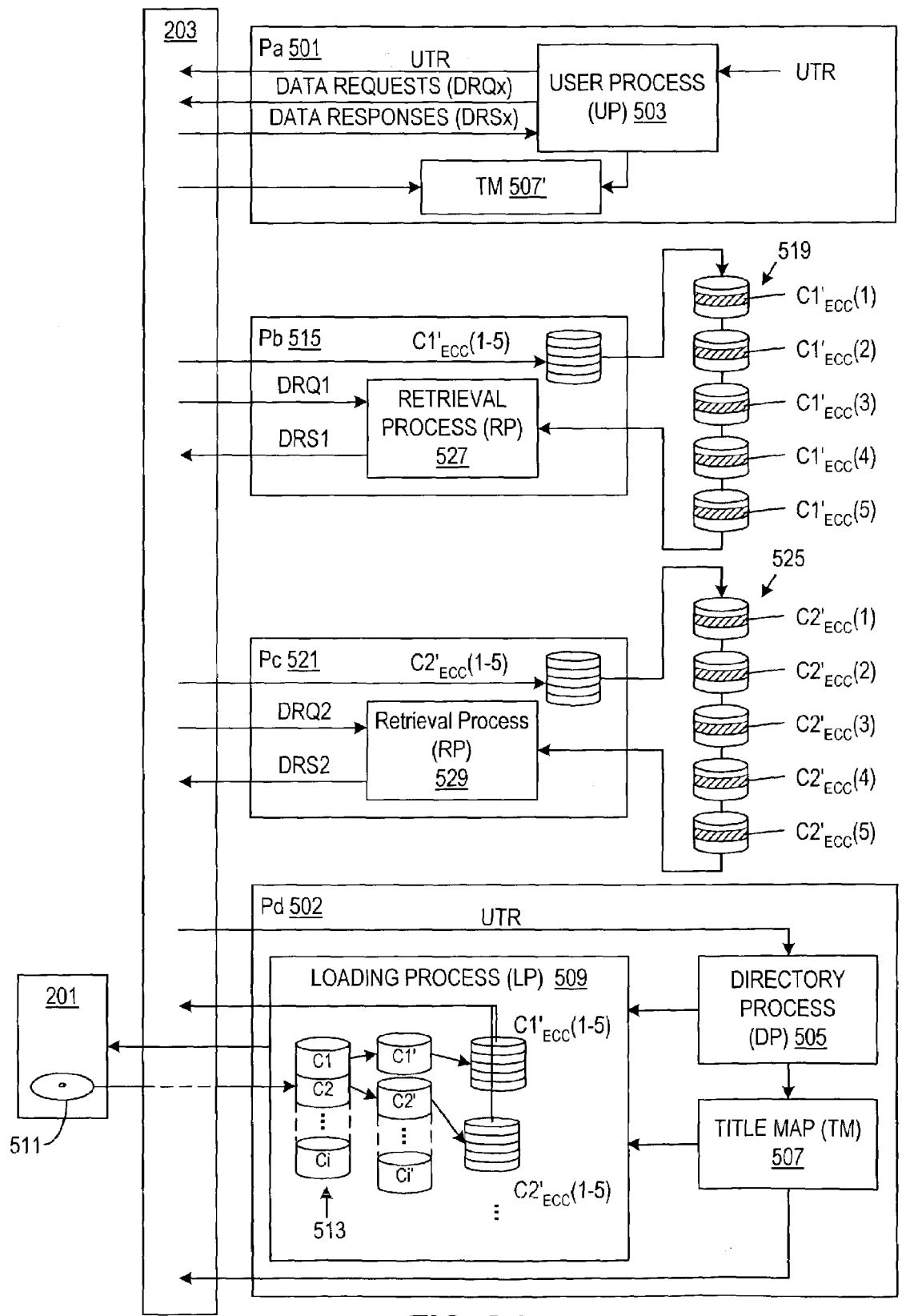
FIG. 5A is a block diagram illustrating user title request (UTR), loading, storage and retrieval of a title initiated by a user process (UP) executing on a selected one of the processors of FIG. 2.
Figure 6:
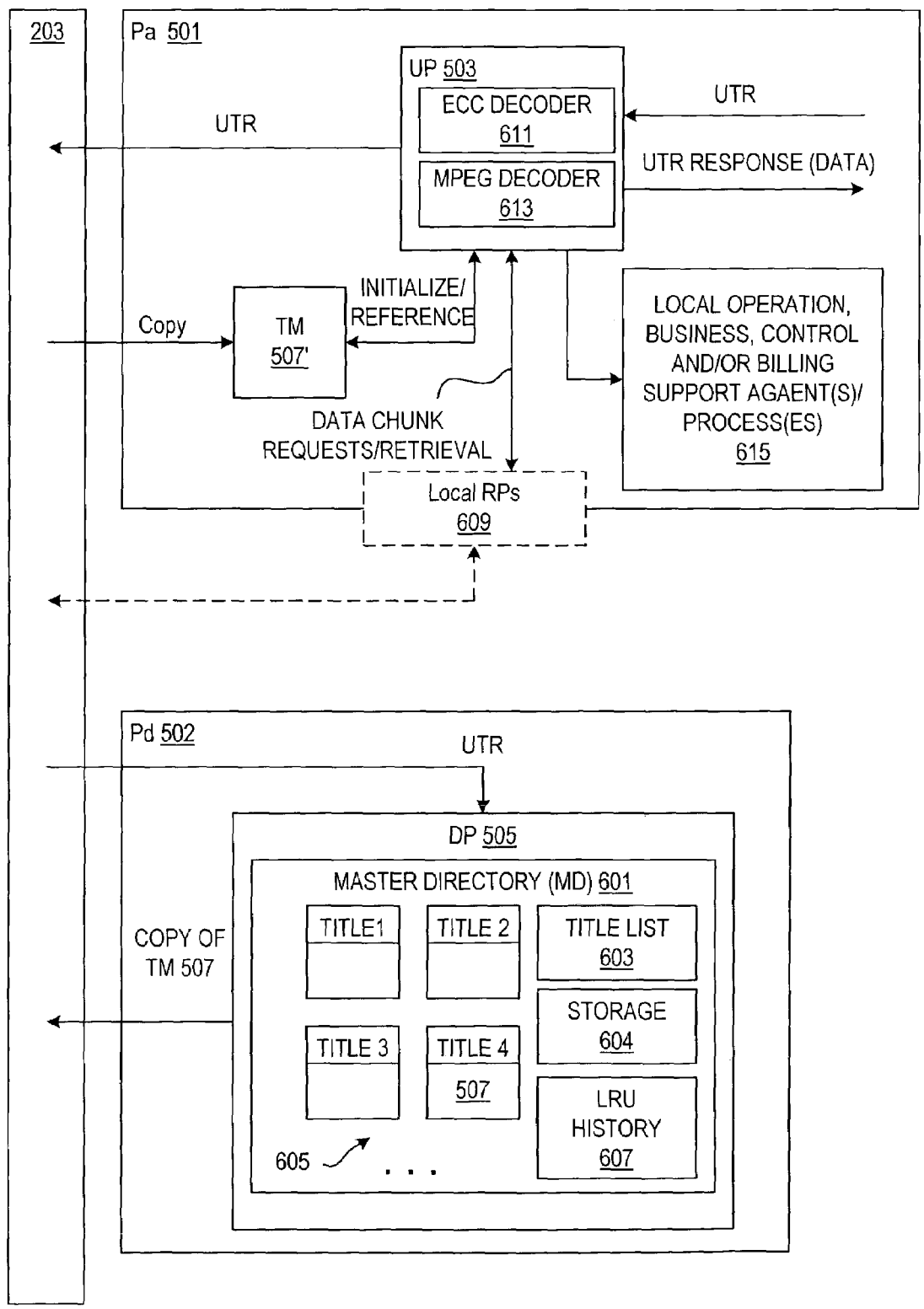
FIG. 6 is a more detailed block diagram illustrating request and retrieval of a title by a user process on one processor and operation of a directory process executed on another processor of the processors of FIG. 2.

FIG. 5A is a block diagram illustrating user title request (UTR), loading, storage and retrieval of a title initiated by a user process (UP) 503 executing on a selected one of the processors 205, shown as processor Pa 501. Each processor 205 executes a separate user process for each of the downstream subscriber locations 105 (users) that it supports. The UP 503 illustrates exemplary operation of user processes for retrieving and sending a title to a subscriber location 105 in response to a user title request (UTR) for that title from that subscriber location 105. The UP 503 forwards the UTR to a directory process (DP) 505 executed on a processor Pd 502, which represents any other of the processors 205 or the management processor 210. As described further below, the DP 505 first determines if the title is already stored in the disk array 207 by consulting a Master Directory (MD) 601 (FIG. 6). If the title is found not to be loaded in the disk array 207, the DP 505 allocates memory (or determines where the next disk space is available) and creates a Title Map (TM) 507 that identifies the location of each successive "chunk" of the title in the disk array 207. As described further below, the title data is divided into data chunks, which are further divided into data sub-chunks, which are distributed among the RAIDs formed by the disk array 207. The TM 507 is a data map that identifies the location of each chunk (and thus sub-chunk) of the title. If the title is already loaded, then the TM 507 already exists for that title in the MD 601 and the DP 505 copies the TM 507 to the UP 503 via the backbone switch 203, where the UP 503 stores it as a local copy shown as TM 507'.

The UP 503 may optionally initialize the TM 507' as further described below to incorporate any parameters or variables associated with the particular user or subscriber location 105. If the title was found not to be loaded in the MD 601 and thus not stored in the disk array 207, then the DP 505 invokes a loading process (LP) 509 for accessing the title from the library storage system 201. The LP 509 sends a request for the title via the backbone switch 203, and the library storage system 201 retrieves a source media 511 of the data, such as a DVD, tape cartridge, etc., and loads the selected media onto an appropriate reader (e.g. tape drive, DVD player, etc.). The reader forwards the data for access by the LP 509 on the processor Pa 501 either via another of the processors 205 or via the backbone switch 203 depending upon the library configuration. The data may be transferred in many different manners, such as a bit-stream of data or the like, and may come from distant as well as local library resources.

The LP 509 organizes the data into a successive array of data chunks C1, C2, C3, Ci, as shown at 513. Each data chunk corresponds to a selected parameter associated with the data, such as a predetermined timing interval or data size. In one embodiment, for example, each data chunk Ci corresponds to approximately one (1) second of video data. Video data to be played at 4 Mbps, for example, may be divided into approximately 500 kilobit (Kb) chunks corresponding to one second of data. The LP 509 is responsible for determining the appropriate divisions between chunks of data. For MPEG-2 data, for example, the data is organized into I, P and B frames that may further be provided in decoding order rather than presentation order. In the MPEG-2 case, the LP 509 determines groups of pictures (GOPs) and determines the appropriate divisions between GOPs to correspond with the selected size or timing interval, such as every 30 displayable frames or the like per second.

The LP 509 may further perform additional processing on content of the chunks of data depending upon the particular configuration. Such processing may include, for example, insertion of bidirectional linked-lists or tags and timing information into the content for purposes of fast forward (FF), rewind (RW), and jump functionality. Such functionality may be desired for implementing personal video recorder (PVR) capabilities for the user, so that the user may process a title in a similar manner as a VCR, such as being able to rewind, fast-forward, pause, record, etc. the content while viewing or for delayed viewing. As shown, for example, the data chunks C1-Ci are processed into data chunks C1'-Ci' denoting altered data depending upon the desired processing performed. The data chunks C1'-Ci' may further be processed for RAID purposes, such as the insertion of ECC data or the like. As shown, for example, the data chunks C1' and C2' are processed into data chunks $C1'_{ECC}(1-5)$ and $C2'_{ECC}(1-5)$, respectively, where each data chunk includes consecutive sub-chunks indexed 1-5 denoting RAID data to be distributed among the five disks of a corresponding RAID.

The LP 509 consults the TM 507 to determine where each chunk of data is to be stored. The precise location in the disk array 207 need not necessarily be specified. In one embodiment, the TM 507 forwards the first chunk $C1'_{ECC}(1-5)$ to a processor Pb 515, the second chunk $C2'_{ECC}(1-5)$ to a processor Pc 521 and so on. It is appreciated that regardless of the particular RAID disk organization 401 employed, maximal distribution of the data is achieved if the data chunks are forwarded to every RAID as evenly as possible. This may be achieved by forwarding consecutive chunks to every other RAID before sending a second chunk to the same RAID. For example, the first 160 chunks may be sent to the RAIDs 1-160 before a second chunk is forwarded to RAID 1. The data chunks do not necessarily have to be distributed in any particular RAID order since the TM 507 keeps a record of the location of each data chunk. In fact, in one configuration, the data chunks are randomly distributed based on any suitable random algorithm. The random algorithm may be pseudo random, for example, to ensure that data is evenly distributed in which the next RAID selected is from a group in which a data chunk has not been stored until all RAIDs are used, and the process is repeated. On the other hand, maintaining a predetermined or sequential RAID order may provide predictability advantages or retrieval efficiencies.

The data chunk $C1'_{ECC}(1-5)$ is forwarded by the LP 509 to processor Pb 515, which distributes the sub-chunks 1-5 of the data chunk $C1'_{ECC}(1-5)$ among the disk drives of its RAID 519. For example, the five sub-chunks $C1'_{ECC}(1)$, $C1'_{ECC}(2)$, $C1'_{ECC}(3)$, $C1'_{ECC}(4)$ and $C1'_{ECC}(5)$ are distributed among the five disk drives of the RAID 519 as shown. It is noted that the number of sub-chunks generated by the LP 509 equals the number of disk drives of the RAIDS, and that any suitable number of disk drives per RAID may be used. The ECC process ensures that the data of any one disk drive may be reconstructed by the data from the other disk drives in the RAID. For example, a sub-chunk $C1'_{ECC}(3)$ may be reconstructed from sub-chunks $C1'_{ECC}(1,2,4,5)$. The data chunk $C2'_{ECC}(1-5)$ is forwarded by the LP 509 to the processor Pc 521, which distributes the sub-chunks of the data chunk $C2'_{ECC}(1-5)$ among the disk drives of its RAID 525 in a similar manner as previously described for the RAID 519. This process is repeated for all of the data chunks $C1'_{ECC}(1-5)$ of the title.

The UP 503 is informed or otherwise determines when data is available for retrieval and for forwarding to the requesting subscriber location 105 in response to the UTR. For example, the UP 503 may monitor the TM 507' or may be informed by the DP 505 that data is available, or may simply submit requests and wait for data to be delivered. In one embodiment, the UP 503 waits until the entire title is accessed, processed and stored in the RAIDs. Alternatively, the UP 503 begins retrieving and forwarding data as soon as predetermined amount of the title is stored or as soon as requested data is delivered. In any event, the UP 503 consults the TM 507' and requests each data chunk from the indicated processors 205 by submitting successive data requests (DRQx) and receiving corresponding data responses (DRSx), where "x" is an integer denoting a data chunk index (e.g., DRQ1, DRQ2, etc.). In one embodiment, each processor 205 executes a local Retrieval Process (RP) that interfaces the corresponding RAID for retrieving requested data chunks. The RP receives a data request DRQx, retrieves the requested data from the local RAID, and forwards a corresponding DRSx. As shown, the processor Pb 515 executes an RP 527 that receives a data request DRQ1, retrieves the data chunk $C1'_{ECC}(1\text{-}5)$ from the RAID 519, and responds with a corresponding data response DRS1. Also, the processor Pc 521 executes an RP 529 that receives a data request DRQ2, retrieves the data chunk $C2'_{ECC}(1\text{-}5)$ from the RAID 525, and responds with a corresponding data response DRS2. The UP 503 receives the data responses and forwards the data chunks to the requesting subscriber location 105. The UP 503 may perform further data processing depending upon the type of data being retrieved. For example, in one embodiment, the UP 503 includes an MPEG decoder 613 (FIG. 6) that reorganizes MPEG-2 data from decode order into presentation order for consumption by the CPE at the subscriber location 105.

The access, storage and retrieval process outlined and described above is particularly suitable for isochronous data, such as audio/video data to be "performed" or otherwise consumed by a television or telephone or computer, etc., at the subscriber location 105 in real time. It is understood, however, that the output data is not limited to isochronous data, but may also be bursty, asynchronous data such as data retrieved for display by a browser executed on a computer. Also, if the CPE at the subscriber location 105 has local storage, the process may operate in a similar manner except that the transmission may be asynchronous rather than isochronous and may occur at a data rate different from the presentation rate of the data.

Many variations and alternatives are contemplated without deviating beyond the scope of the present invention. For example, the reconstruction or decoding process, if necessary, may be performed by some process other than the user processes. The reliability of the reconstruction should be greatest at the user process since it has a separate data path to each sub-chunk used for the reconstruction of the title.

Figure 5B:
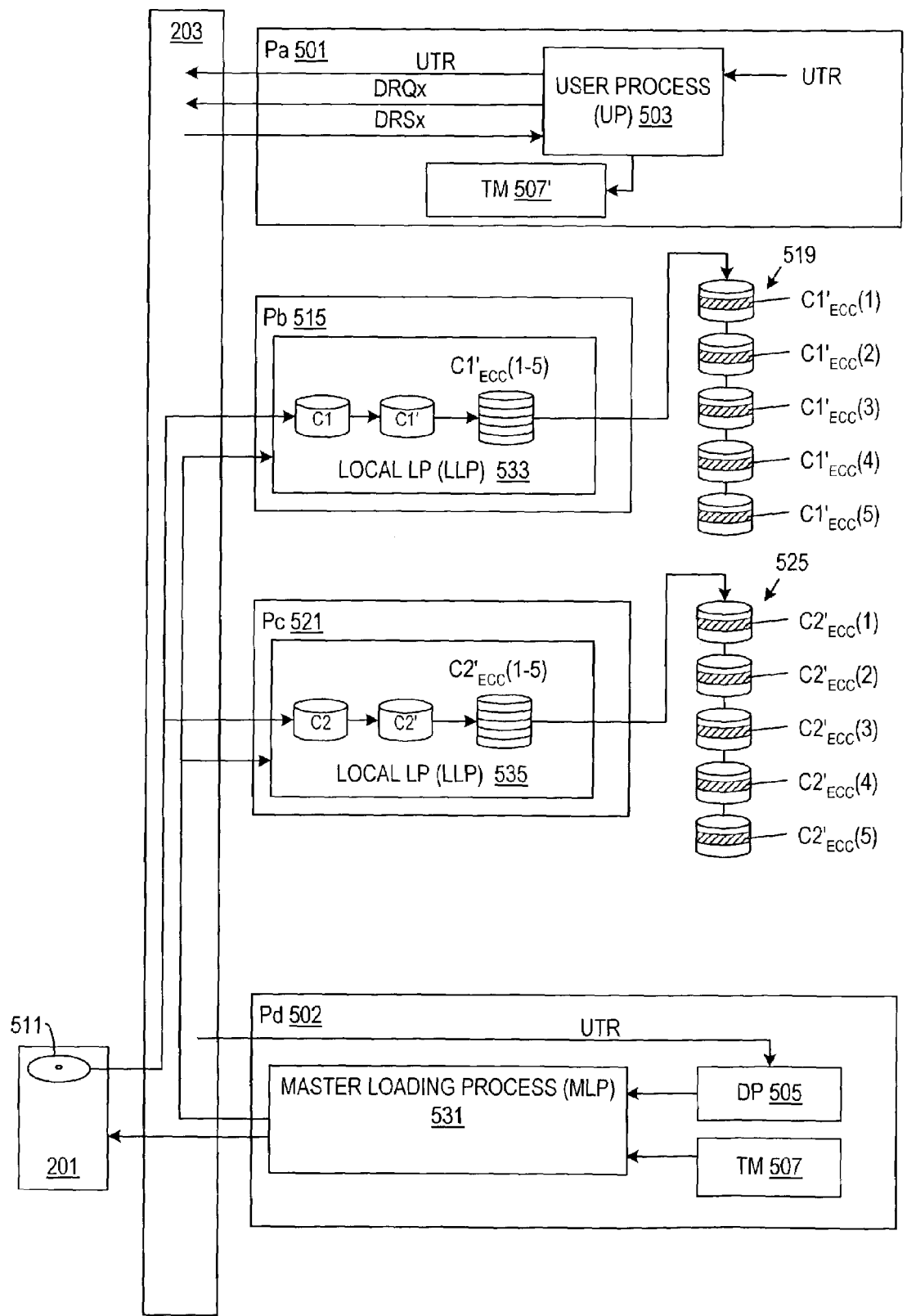
FIG. 5B is a block diagram illustrating an exemplary distributed loading process for accessing and storing requested titles.

FIG. 5B is a block diagram illustrating an exemplary distributed loading process for accessing and storing requested titles. In this embodiment, if the DP 505 finds the title in the MD 601 is not loaded, it invokes a master loading process (MLP) 531. The MLP 531 sends a request to the library storage system 201 and consults the TM 507 in a similar manner as previously described for determining where the data chunks are to be stored. Instead of retrieving the data to the processor Pd 502, the MLP 531 invokes local loading processes (LLP) which communicate with the processors 205 that control the disk drives constituting each of the RAID groups in which the corresponding data sub-chunks are to be stored. For example, an LLP 533 is invoked on the processor Pb 515 and the data chunk C1 is forwarded directly from the source media 511 to the LLP 533. In a similar manner, an LLP 535 is invoked on the processor Pc 521 and the data chunk C2 is forwarded directly from the source media 511 to the LLP 535. As shown, subsequent processing may be performed on the respective LLPs 533, 535 and stored in the corresponding RAIDs 519, 525 as directed by the MLP 531. In this manner, rather than loading and processing the data chunks on one processor and then forwarding the data chunks to distributed processors thereby requiring two passes through the backplane switch 203, the respective data chunks are forwarded directly to, and processed directly by distributed processors requiring less bandwidth of the backplane switch 203. It is noted that even though the data may be provided directly to a DVD player connected to a processor 205, the backplane switch 203 is still employed to transfer data to the appropriate ones of the processors 205 executing the LLPs.

Figure 5C:
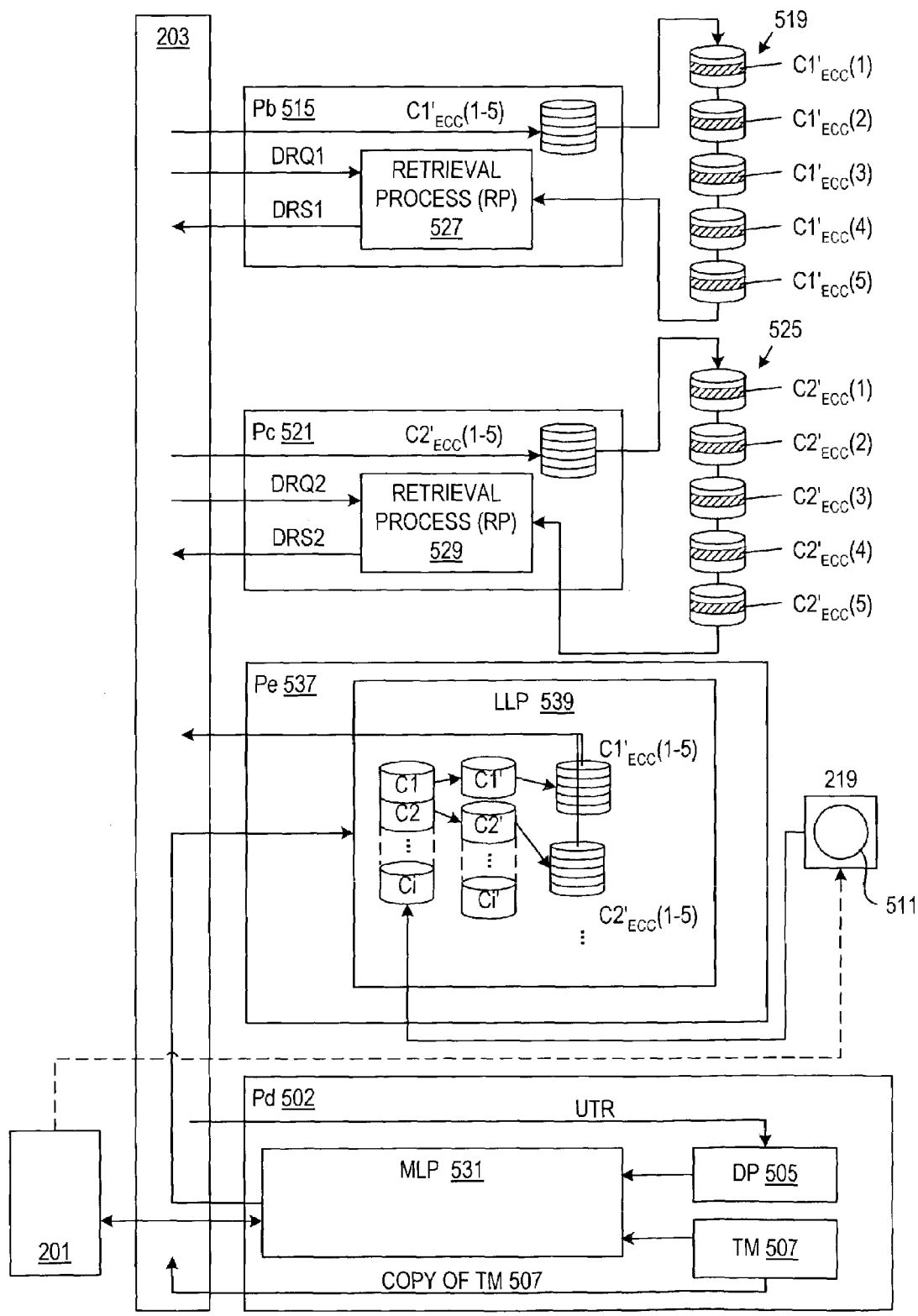
FIG. 5C is a block diagram illustrating an exemplary coordinated loading process for accessing and storing requested titles using the distributed optical disk drives of FIG. 2.

FIG. 5C is a block diagram illustrating an exemplary coordinated loading process for accessing and storing requested titles using the distributed optical disk drives 219. The DP 505 invokes the MLP 531, which submits a request to the library storage system 201 in a similar manner as previously described. The library storage system 201 selects a random or available one of the distributed optical disk drives 219, such as one associated with a processor Pe 537 as shown. In this manner, the source media 511 is local to the processor Pe 537. The MLP 531 identifies the processor Pe 537 (such as being informed by the library storage system 201) and invokes an LLP 539 on the processor Pe 537 for loading and storing the title in a similar manner as previously described, such as distributing the data chunks to processors Pb 515, Pc 521, etc. The RAID and ECC processing may optionally and conveniently be performed on the processor Pe 537 since all the data passes through that processor. In this manner, bandwidth usage on the backplane switch 203 is reduced.

As appreciated by those skilled in the art, any given process, such as the loading process 509 or 531, the retrieval processes 529, etc., may be executing on any one or more of the processors 205. Although FIGS. 5A-5C illustrate the loading and retrieval processes operating with entire chunks at a time through respective processors for clarity of illustration, it is understood that the data sub-chunks of each chunk are distributed within a RAID group, which spans across several processors. Thus, any given processor may read or write only one sub-chunk at a time for a given storage or retrieval process. For example, although FIG. 5A illustrates chunk C1'(1-5) handled by a processor Pb 515, each individual data sub-chunk may be written or read by a separate processor associated with a corresponding disk drive of a given RAID group. Although each processor 205 may control data read from or written to connected disk drives, RAID functionality may be handled by separate processes executed on other processors (e.g., RAID functionality may be virtual and implicit in system functionality).

FIG. 6 is a more detailed block diagram illustrating request and retrieval of a title by a user process on the processor Pa 501 and operation of the DP 505 executed on a processor Pd 502. Similar blocks or processes may assume identical reference numbers. In a similar manner as previously described, the user process (UP) 503 receives and forwards the UTR to the DP 505 executed on the processor Pd 502. The DP 505 includes the MD 601, which further includes a title list 603 which lists all of the titles available in the library storage system 201 and the corresponding location(s) of each title. All titles remain stored and available in the library storage system 201, and may further be copied in the disk array 207. The MD 601 also includes a storage file 604, which maps all of the storage in the disk array 207 including empty space and the location of every title. Titles that have been previously requested are retrieved and stored in the disk array 207 using any configuration of the loading process(es) previously described, and a title map is created by the DP 505 and stored within the MD 601. The title maps currently stored in the MD 601 are shown as TMs 605, each having a respective title, shown as Title 1, Title 2, Title 3, etc. An entry is made in the title list 603 associated with each title stored in the disk array 207 and having a DM 601 in the MD 601 for reference by the DP 505. As long as a title is stored within the disk array 207, then a DM 605 exists for it in the MD 601 and is further reflected in the title list 603. It is noted that the DP 505 is shown as a central process located on any one of the processors 205 or the management processor 210. In an alternative embodiment, the DP 505 may be a distributed processes executed across the processors 205. It is desired, however, that the MD 601 be centrally located to maintain consistency and coherency of the titles and other data of the library storage system 201.

In an exemplary embodiment, the titles are stored in the disk array 207 based on a least-recently used (LRU) policy. In this manner, once an existing title is stored in the disk array 207 and referenced in the MD 601, it remains there until overwritten by a more recently requested title when the storage space is needed for the new title and when the existing title is the oldest title reference in the MD 601. The MD 601 tracks the relative age of each title stored in the disk array 207 in a history file 607, where the age of a title is reset when that title is requested again. Any title newly loaded from the library storage system 201 or requested again from the MD 601 becomes the most recent title, and an age parameter is stored for each title in the MD 601 corresponding to when it was last requested. As long as blank storage exists in the disk array 207 for a new title loaded from the library storage system 201, the empty storage is used and loaded titles remain stored in the disk array 207. However, when empty storage no longer exists, the DP 505 allocates space by overwriting one or more of the oldest titles in the MD 601 to store the new title. When a title is overwritten in the disk array 207, its associated DM 605 is removed from the MD 601. Also, the local reference is removed from the title list 603 so that the title list 603 indicates that the title is only located in the library storage system 201. If the overwritten and erased title is requested again, it is newly loaded from the library storage system 201.

If a requested title is not stored in the disk array 207 and thus not referenced in the MD 601, then the DP 505 consults the storage file 604 and the history file 607 to allocate storage space for the new title, and then creates a new DM within the MD 601. If the title is already stored in the disk array 207, then a title map (TM) already exists in the MD 601. As shown, the UTR is forwarded to the DP 505, which locates or otherwise creates the TM 507 (shown as "Title 4"). The DP 505 then forwards a copy of the TM 507 to the requesting processor Pa 501, which stores a local copy as the TM 507' as previously described.

The UP 503 initializes header information of the TM 507' according to its own operating parameters and user contract. The UP 503 then consults the TM 507' for the location of the data chunks and cooperates with the local Retrieval Processes (RPs) of the other processors 205 managing the data, representatively shown as 609, via the backbone switch 203 to retrieve the stored data chunks. In the embodiment shown, the UP 503 includes an ECC decoder 611 or the like for converting the ECC encoded format to the actual data without the incorporated redundant information. Recall that the data chunks are stored as sub-chunks on the disk drives of a RAID, so that the ECC decoder 611 is used to reconstruct the original data by removing the redundant data. It is noted that the multiple disk drives of any given RAID may have variable speeds or response times. In this manner, the local RPs 609 do not necessarily return the data as a single chunk but instead as a series of sub-chunks according to the response times of the individual disk drives of the particular RAID. Also, a given disk drive of a given RAID may be faulty or non-responsive for whatever reason. In either event, the UP 503 employing the ECC decoder 611 is able to decode the correct data using less than all of the defined sub-chunks. For example, for RAIDs configured using 5 disk drives, the ECC decoder 611 is capable of reconstructing the original data using any 4 of the 5 sub-chunks of data. In one embodiment, the ECC decoder 611 automatically regenerates the original data rather than waiting for the last sub-chunk to arrive to speed up the overall process.

In the embodiment shown, the UP 503 further includes an MPEG decoder 613 or the like for reconstructing the data into presentation order if desired. For example, if MPEG data is accessed and stored in decoding order, the MPEG decoder 613 reconstructs the data into presentation order and then sends the data to the requesting subscriber location 105. As described previously, the UP 503 operates in isochronous mode in one embodiment in which the data stream to the subscriber location 105 is maintained at the appropriate rate to ensure proper operation of the CPE at the subscriber location 105. In an alternative embodiment, if the CPE includes local memory, then the UP 503 may operate in asynchronous mode and deliver each data chunk in sufficient time for proper presentation by the CPE at the subscriber location 105. The UP 503 is further configured to detect additional commands from the subscriber location 105, such as rewind (RW), pause or fast forward (FF) commands, and if supported by the processor Pa 501 and if allowed according the corresponding user agreement, alters the data stream accordingly. For example, the UP 503 may interrupt the current data stream and move backwards or forwards in the TM 507 by accessing previous or subsequent data in response to a RW command or a FF command, respectively.

A set of local agents or processes 615 is shown provided executing on the Pa 501, which are provided on each of the processors 205. In one embodiment, each of the processors 205 execute one or more local agents that interface corresponding management, OSS, BSS, control and billing functions and processes executed on the management processor 210. In an alternative embodiment, the management processor 210 is not provided and the management, OSS, BSS, control and billing functions and processes are distributed among one or more of the processors 205. The agents or processes 615 may include, for example, a local business process for tracking user activity associated with each of the subscriber locations 105 supported by the processor Pa 501. The local business process tracks the user activity of all users supported by the processor Pa 501 for purposes of billing or the like. As an agent, the local business agent interfaces with the BSS 213 for sending user information including billing information or any other desired information. A local business agent may perform the functions of the software agent or application that monitors and tracks billing information for each subscriber location 105 based on a predetermined billing arrangement as previously described. The billing information is sent to the control system 215 for forwarding to the billing system 217 of the BSS 213.

Figure 7:
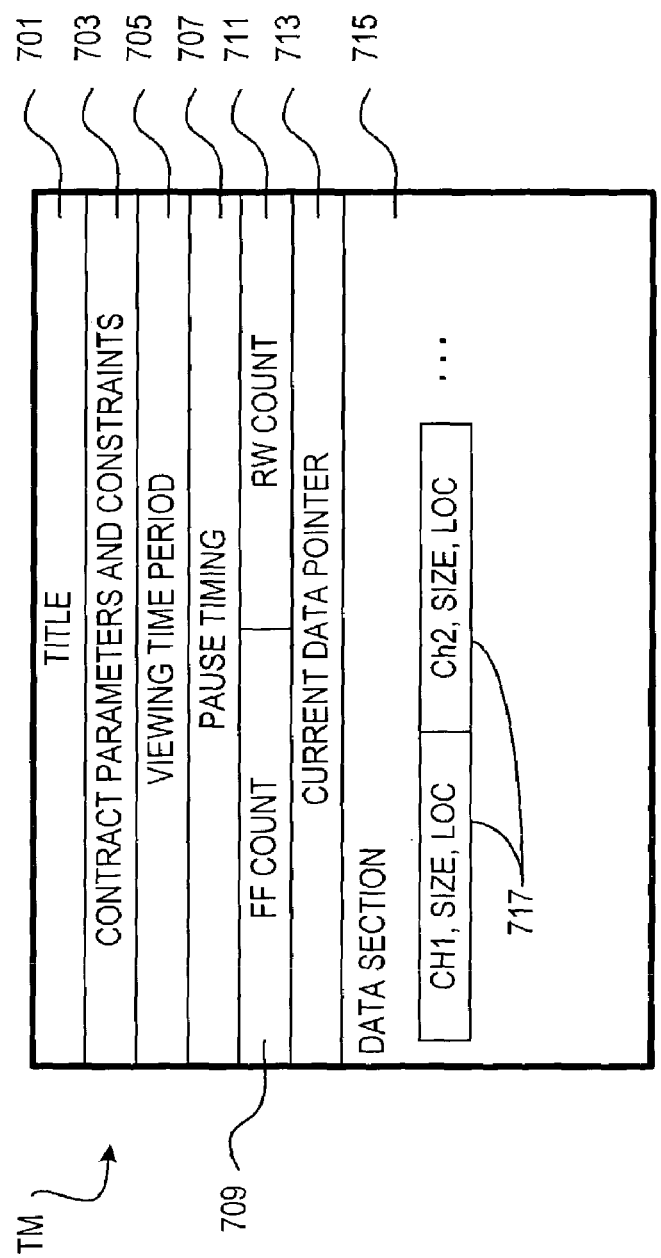
FIG. 7 is a more detailed block diagram of an exemplary title map employed by various processes, including user processes, directory processes, loading processes, etc.

FIG. 7 is a more detailed block diagram of an exemplary title map TM that may be used as the TM 507 previously described. The DM may include a title field 701 for storing the title and a Contract Parameters and Constraints field 703 for storing any information associated with the particular user and/or any applicable contract associated with that user or subscriber location 105. Some examples are shown, such as a View Time Period value 705, a Pause Timing value 707, a FF Count 709 and a RW Count value 711. The View Time Period value 705 may be included to represent a maximum amount of time that the user has to actively view the title after being requested. The Pause Timing value 707 may be included to represent a maximum amount of time that the title will be available without further payment if the user interrupts their viewing. The FF and RW Count values 709, 711 may be included to count or otherwise limit the number of times that the user has to perform a fast-forward or rewind function, respectively. For example, a "no rewind" clause or a "rewind no more than three times" clause may be included in a studio contract in which the RW count value 711 is used to prevent rewind or to limit the number of rewinds to three, respectively. A Current Data Pointer 713 may be included to store an address or pointer to mark the location between data sent and data to be sent, so that the UP 503 is able to keep track of data progress. A Data Section 715 is provided to store a list of data chunk addresses or pointers, such as a consecutive or linked list of data chunk fields 717 including information such as data chunk number, size, location (loc), etc.

It is appreciated that the DM shown is exemplary only in that many variations and configurations or additional parameters may be employed depending upon various design parameters. The UP 503 initializes the DM according to the applicable user contract in place, such as the particular View and Pause timing parameters or FF/RW Counts as appropriate. The Current Data Pointer 713 is reset to zero or otherwise to point to the first data chunk to initialize the viewing process at the beginning. Resetting the Current Data Pointer 713 might be necessary if the DM is copied from another processor 205 for a title already stored.

Figure 8:
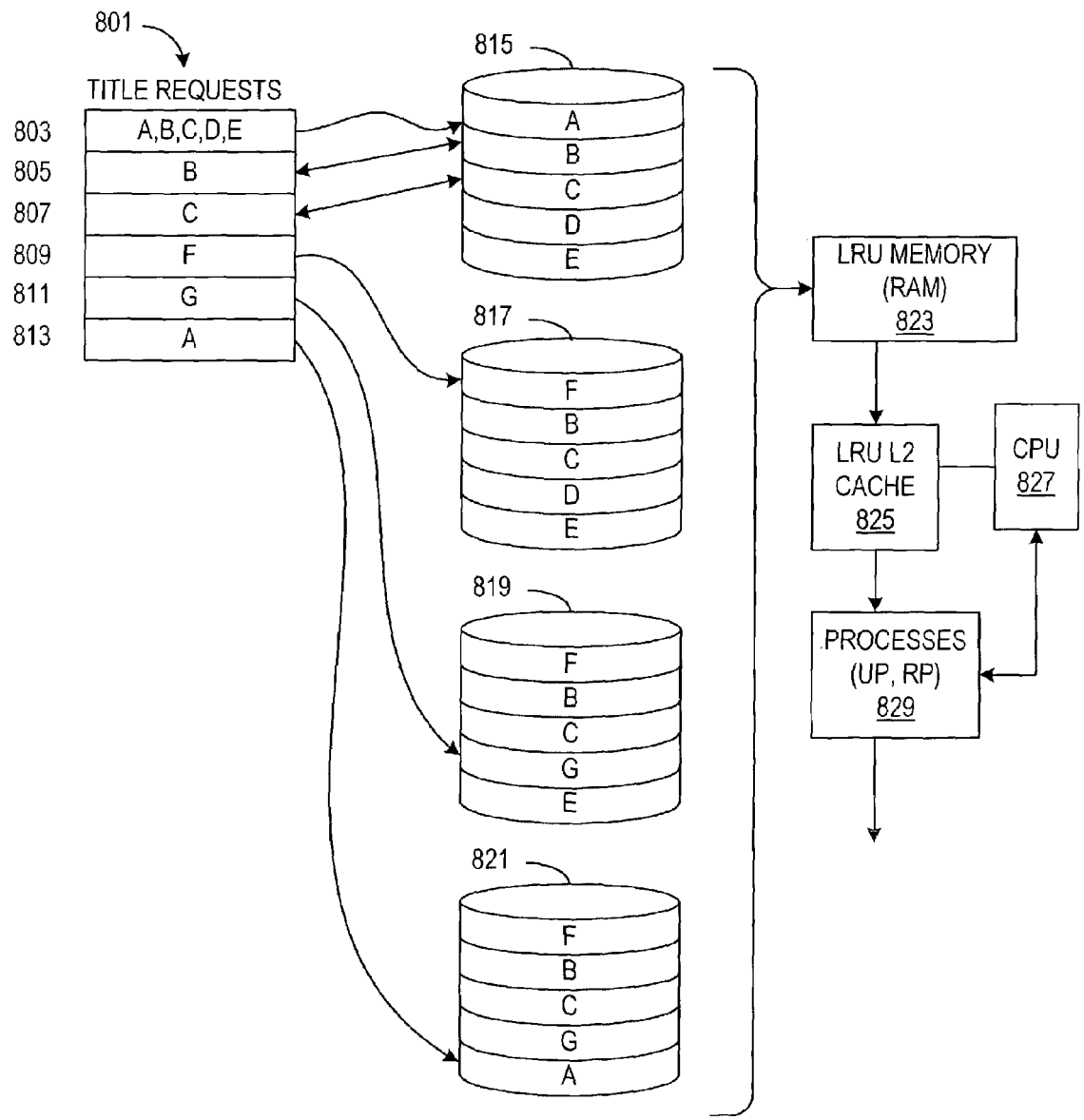
FIG. 8 is a block diagram illustrating a caching and Least-Recently-Used (LRU) strategy used by the IBS system of FIG. 1 for storage and retrieval of titles and data.

FIG. 8 is a block diagram illustrating a caching and Least-Recently-Used (LRU) strategy used by the IBS system 109 for storage and retrieval of titles and data. The LRU strategy is employed in the disk array 207 forming the RAIDs in that empty storage space is used first and when there is no more empty space, the oldest data is overwritten first. The caching strategy ensures that data is pulled from the fastest memory or storage location in which it is stored at any given time. The caching strategy is hierarchical in that the disk array 207 serves as a data "cache" for the library storage system 201, and the respective memories 305 of the processors 205, shown collectively as a memory 823, serves as the data cache for the disk array 207. Additional layers may exist, such as large memory caches for locally read sub-chunks (also managed on an LRU basis), level two (L2) caches of the CPUs 303, which serve as cache memories for the respective memory 303 of each processor 205. Level one caches are typically incorporated within the respective CPUs and not shown or described. The respective CPUs 303 are collectively shown as a CPU 827 and L2 caches are collectively shown as an L2 cache 825. Output caches per user stream may also be used to buffer any rate variations from storage caused by peaks in demand, but these buffers are discarded as soon as the user process terminates.

A stack of title requests 801 is a simplified representation of UTRs initiated by users for titles, individually labeled as "A", "B", "C", etc. A first block 803 represents the first five UTRs for titles A, B, C, D and E, respectively. A storage representation 815 is a simplified representation of the collective storage capacity of the disk array 207, shown as capable of storing only up to five equal-sized titles. Of course, in an actual configuration, the storage capacity of the disk array 207 is substantially greater and the titles are of variable size. The first five titles A-E are shown as stored in consecutive locations as shown by the storage representation 815. Again, this representation is simplified in that each title is actually subdivided and distributed among the RAIDs. It is first noted that the disk array 207 is initially empty, so that each title A-E must be retrieved from the library storage system 201 resulting in the greatest data retrieval latency within the IBS system 109. It is also noted that each of the first sets of titles retrieved are stored in empty data locations rather than overwriting existing titles, so that each title remains in the disk array 207 as long as possible according to the LRU strategy.

The next title requested "B" shown at block 805 is already stored as shown by the storage representation 815 and thus may be retrieved from the RAIDs of the disk array 207 rather than the library retrieval system 201. In this manner, as long a title remains completely stored in the disk array 207, it may be retrieved significantly faster since the disk array 207 operates significantly faster than the library storage system 201. When a title is cached in processor memory, it can be retrieved several orders of magnitude faster than from the disk array 207. The same is true for the next title requested "C" shown at block 807, since it is already stored in the disk array 207 as shown by the storage representation 815 and need not be retrieved again from the library storage system 201. It is noted that the DM created for each title and stored in the MD 601 remains valid as long as that title remains stored in the disk array 207. The "master" copy of the DM in the MD 601 is copied to any of the processors 205 requesting the same title. Thus, the original DM for titles B and C are copied and reused so that the titles B and C remain in the disk array 207 longer than if only requested once. An additional partial data strategy may optionally be employed in that even partially stored titles in the disk array 207 are re-used rather than retrieving the entire title from the library storage system 201. For example, in this partial data configuration, even if the titles B or C were partially overwritten in the storage representation 815, the existing portion may be used while the erased portion is retrieved from the library storage system 201. Such partial data strategy would require additional data tracking and management functions.

A new title F is next requested as shown at 809 at a time when empty storage space in the disk array 207 is no longer available. The oldest data in the disk array 207 is the title A, so that the new title F replaces the old title A in accordance with the LRU strategy as shown by a new storage representation 817. The titles B, C, D and E remain stored in the disk array 207 along with the new title F. A new title G is next requested as shown at 811, which again must replace the oldest data in the disk array 207, which is the title D as shown by a new storage representation 819 including titles F, B, C, G and E. The title A is requested again as shown at 813. Since the data for the title A form the original request has already been overwritten and no longer exists within the disk array 207, it is treated as a new title to replace the oldest data stored in the disk array 207. In this manner, the new title A replaces the oldest title E in the disk array 207 as shown by a new storage representation 821. It is appreciated that the LRU strategy stores data in the disk array 207 as long as possible before allowing the data to be overwritten by new titles.

The CPUs 827 execute the processes 829 that process the title data including the user processes (UP) and local RP processes used to retrieve data from the disk array 207. The CPUs 827 generally operate using the memory 823, so that data retrieved from the disk array 207 is first stored within the local memory 823 prior to forwarding to the backbone switch 203 and/or to a subscriber location 105. Also, the CPUs 827 may include L2 caches 825 that enable faster and more efficient data retrieval. The CPUs 827 automatically retrieve data requested by the processes 829 first from the L2 cache 825 if there, then from the memory 823 if there, and finally from the disk array 207. If the data is not already stored in the disk array 207, the DP 505 invokes the loading processor 509 or MLP 531 for retrieving the title from the library storage system 201 into the disk array 207 as previously described. In this manner, the memory 823 and the L2 caches 825 serve as cache layers above the disk array 207. The memory 823 and the L2 caches 825 generally operate according to the LRU strategy, so that data remains in these memories as long as possible before being overwritten by new data. According to the LRU strategy, when the RAM cache area is full and new data is read, the oldest segment of data in the RAM is erased by the new content that reuses that area of memory in a similar manner as the LRU strategy employed within the disk array 207. In this manner, with LRU and caching, if the requested data has been so recently read that it is still in RAM, it is served from RAM with no need to access the disk array 207, and if it is still in the disk array 207, it is served from the disk array 207 rather than accessed from the library storage system 201. It is appreciated that more popular titles are more likely to reside in memory or the disk drives and thus are retrieved significantly faster than less popular titles that are not requested as often.

Figure 9:
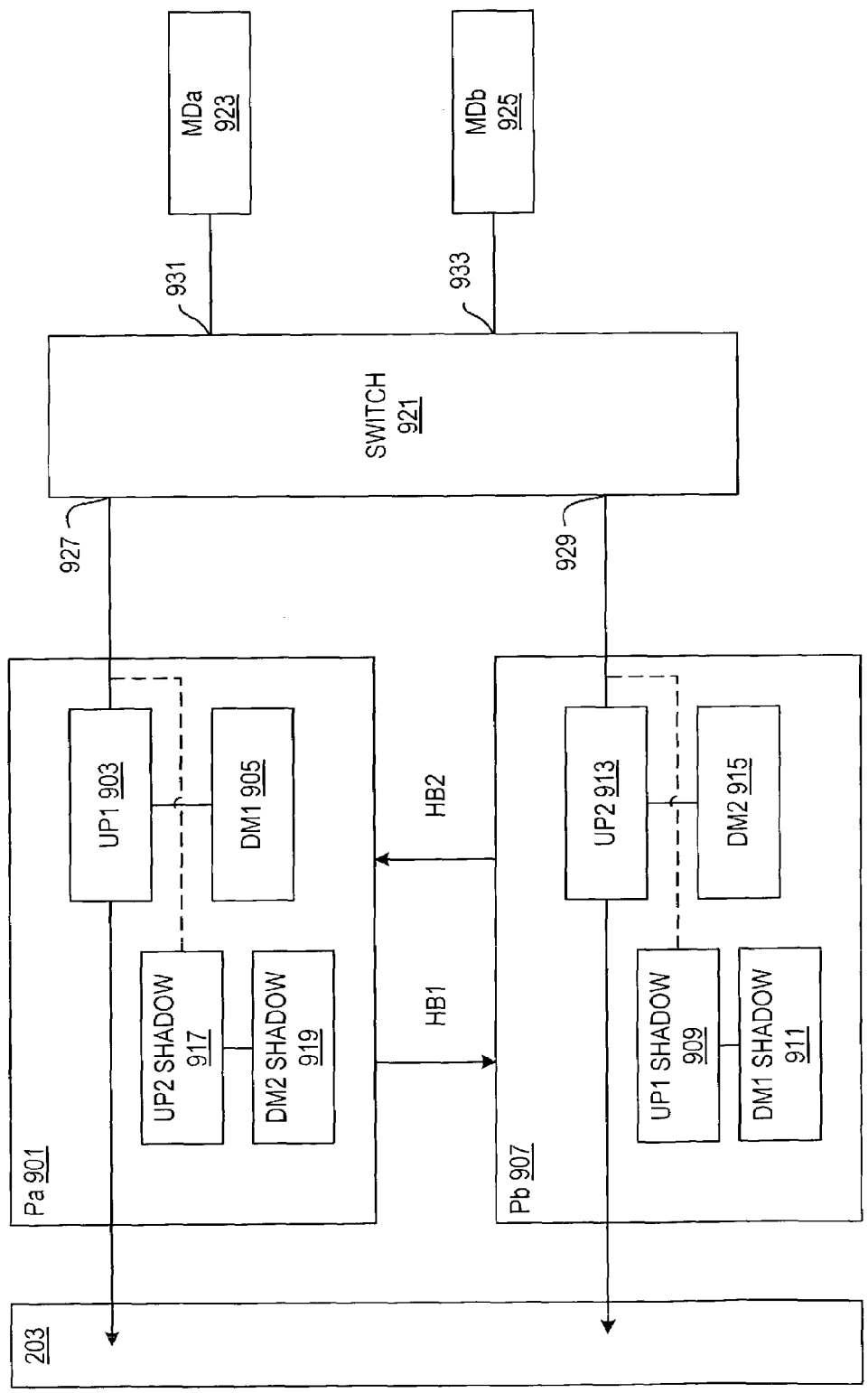
FIG. 9 is a block diagram illustrating shadow processing according to an embodiment of the present invention.

FIG. 9 is a block diagram illustrating shadow processing according to an embodiment of the present invention. A first processor Pa 901 executes a first user process UP1 903 which uses a first title map TM1 905. A second processor Pb 907 executes a shadow user process for UP1, shown as UP1 Shadow 909, which uses a shadow title map TM1 Shadow 911. In this configuration, for each normal user process executed on one processor, a shadow user process is executed on another processor. Also, when a directory process is copied from the MD 601, a copy is also made on the shadowing processor as controlled by the shadow user process. As long as UP1 903 is operating normally, UP1 Shadow 909 merely mimics or mirrors UP1 903 and performs relatively minimal processing. In particular, UP 1 Shadow 909 simply tracks the progress of UP1 903, such as shadowing the current data location within the DM1 905 by the DM1 Shadow 911, among other shadow functions. In this manner, the amount of overhead processing performed by the processor Pb 907 for implementing the shadow processing UP1 Shadow 909 and DM1 Shadow 911 is minimal. In a similar manner, the second processor Pb 907 executes a second user process UP2 913 which uses a second title map DM2 915. The first processor Pa 901 executes a shadow user process for UP2, shown as UP2 Shadow 917, which uses a shadow director map DM2 Shadow 919. Again, as long as UP2 913 is operating normally, UP2 Shadow 917 merely mimics or mirrors or otherwise tracks the progress of UP2 913 among other shadow functions.

In this manner, it is appreciated that the processors Pa 901 and Pb 907 track each other with respect to at least one user process. Although not explicitly shown, every user process executed on a given processor, such as the processor Pa 901, is mirrored by a shadow process on another processor 205 and not necessarily the same processor. For example, if the processor Pa 901 is executing 250 user processes, then there are 250 shadow processes distributed on the other processors 205, or otherwise executed on at least one other processor, such as the processor Pb 907. Also, the processor Pa 901 may execute at least one shadow process for another user process executed on another processor 205, or otherwise may execute up to 250 or more shadow processes assuming each processor 205 generally handles up to 250 user processes. In one embodiment all user processes executed on a given processor, such as the processor Pa 901, are shadowed by one other processor, such as the processor Pb 907, and vice-versa.

A heartbeat signal HB1 is provided from the processor Pa 901 to the processor Pb 907. The HB1 signal may be generated by a software process, a hardware process, or a combination of both. For example, the HB1 signal may be directly associated with the user process UP1 903 executing on the processor Pa 901, or may be associated with all user processes executing on the processor Pa 901. Alternatively, the HB1 signal may be hardware related and generated by the processor Pa 901 or its CPU. The HB1 signal is a periodic or continuous signal that generally operates to indicate the status of the originating computer. For example, as long as the HB1 signal is periodically or continuously generated (or otherwise continuously negated) by the processor Pa 901, then the processor Pb 907 assumes that the processor Pa 901 is operating normally and continues to shadow its progress. If, however, the HB1 signal indicates failure, such as when the processor Pa 901 fails to assert the HB1 signal for a predetermined period of time, or if/when the HB1 signal is negated or asserted (such as a ground signal or open circuit hardware signal), then the processor Pb 907 assumes failure of the associated processes or of the processor Pa 901, and the processor Pb 907 activates the user process UP1 Shadow 909 to take over for the primary user process UP1 903. Since UP1 Shadow 909 keeps track of UP1 903, UP1 Shadow 909 almost immediately takes over exactly where UP1 903 left off in a transparent manner so that the end user at the corresponding subscriber location 105 does not experience interruption in service. The timing of the HB1 signal is designed to enable the shadow process UP1 Shadow 909 to assume control of service of the UP1 903 without interruption in service. Another heartbeat signal HB2 asserted by the processor Pb 907 to the processor Pa 901 operates in a similar manner to enable the shadow process UP2 Shadow 917 to take over processing of the primary process UP2 913 in the event of a failure of one or more process executing on the processor Pb 907 or a failure of the processor Pb 907 itself. One format for the heartbeat signal is a numeric value which indicates the position of the master process in the file being displayed, thus serving as a heartbeat and status indicator.

In one embodiment, all of the primary user processes executed on the processor Pa 901 are shadowed by corresponding shadow processes on the processor Pb 907 and vice-versa. In this embodiment, the processors 205 are all paired so that a first processor shadows a second processor of the pair and vice-versa. In this manner, the shadow processes of a shadowing processor assume primary processing responsibility in the event of failure of any of the processors 205. A corresponding one of a series of similar switches 921 is provided at the outputs of each pair of processors 205 to enable transparent and automatic switching between primary and shadow processes. As shown, the output of the processor Pa 901 is coupled to a port 927 and the output of the processor Pb 907 is coupled to a port 929 of the switch 921. A third port 931 of the switch 921 is coupled to a modulator/demodulator MDa 923 for the processor Pa 901 and another port 933 is coupled to a modulator/demodulator MDb 925 for the processor Pb 907. The switch 921 is addressed-based, such as a 4-port Ethernet switch or the like where each port 927-933 operates at 1 Gbps or more.

During normal operation, the data asserted by the processor Pa 901 is addressed to the MDa 923 so that data entering the port 927 is forwarded by the switch 921 to the port 931. Likewise, during normal operation, the data asserted by the processor Pb 907 is addressed to the MDb 925 so that data entering the port 929 is forwarded by the switch 921 to the port 933. In the event of a failure of the processor Pb 907, the HB2 signal indicates such failure so that the shadow process UP2 Shadow 917 takes over for the primary process UP2 913. The shadow process UP2 Shadow 917 asserts data to the port 927 of the switch 921 yet addressed to the MDb 925, so that the switch 921 automatically forwards the data to its port 933 rather than port 931. The data asserted by the process UP1 903 continues to be addressed to the MDa 923, so that this data entering port 927 is still forwarded by the switch 921 to the port 931. In this manner, failure of the processor Pb 907 is essentially transparent to the subscriber locations 105 associated with the processes UP1 903 and UP2 913. In a similar manner, in the event of failure of the processor Pa 901, the shadow process UP I Shadow 909 takes over for the failed primary process UP1 903 and addresses data to the MDa 923, which is forwarded by the switch 921 from port 929 to port 931. In this manner, failure of the processor Pa 901 is essentially transparent to the subscriber locations 105 associated with the processes UP1 903 and UP2 913.

It is further noted that the switch 921 automatically handles upstream subscriber data so that the activated shadow process receives any subscriber data sent from the correct subscriber location 105. In particular, if the shadow process UP2 Shadow 917 is activated to take over for the primary process UP2 913, then data sent to the MDb 925 addressed to the processor Pb 907 for the failed primary process UP2 913 is automatically forwarded by the switch 921 from port 933 to port 927 and received by the shadow process UP2 Shadow 917. Likewise, if the shadow process UP1 Shadow 909 is activated to take over for the primary process UP1 903, then data sent to the MDa 923 addressed to the processor Pa 901 for the failed primary process UP1 903 is automatically forwarded by the switch 921 from port 931 to port 929 and received by the shadow process UP1 Shadow 909.

It is further noted that if the processor Pa 901 is shadow-paired with the processor Pb 907, then in the event of failure of the processor Pa 901 (or Pb 907), then the other processor Pb 907 (or Pa 901) assumes responsibility for all user processes of the failed processor. In this manner, the shadowing processor immediately assumes all data processing responsibility for all of the users for both processors. It is noted that although the shadowing process has been described with respect to user processes, that process shadowing is enabled for other processing functions associated with user service, such as, for example, RAID controllers, retrieval processes, loading processes, directory processes, business processes, etc. If such failure occurs during high usage such as during peak hours, and if the processors 205 are not designed to handle the combined total processing of such pairs of processors, then it is possible (or likely) that the remaining processor is unable to handle the entire processing capacity for both processors.

It is contemplated that service degradation occurs gracefully in the event a given processor 205 is over-subscribed, such as in the event of a failure of another processor. Under normal circumstances, excess network bandwidth may be used for "Barker channels", previews, and available bit rate asynchronous traffic. If a failure occurs and the shadowing process cannot assume all current processing, Barker channels or previews revert from videos to still images or are diverted to other services, such as infomercials or the like. ABR traffic may be greatly diminished. If a large portion of the bandwidth of a processor 205 are used for non-revenue services, such services are the first to be eliminated in the event of an emergency. As a last resort, customer streams are interrupted on a priority basis, such as first-come, first-served (FCFS) or higher revenue streams are maintained, etc. In one embodiment, for example, the shadowing processor attempting to assume responsibility for both processors determines that it is unable to assume the entire processing capacity of the failed processor, then the shadowing processor selectively assumes responsibility for only those processes that it is able to handle at the time. For example, the shadowing processor may take on only a subset of user processes on a FCFS basis or the like. In this manner, many users would not experience interruption in service although the remaining users would.

It is noted that the titles and information may be stored various formats in the library storage system 201 depending upon the type of data and depending upon the processing capabilities of the IBS system 109. Also, the data may be processed by one or more processes during the loading and storing processes or during the retrieval and delivery processes. Examples have been given herein, such as converting MPEG-2 data from decoding order to display order, generating ECC information for RAID storage, adding tags and timing information for enabling PVR capabilities (e.g., fast-forward, rewind, pause), etc. Other information and content may be added, such as splice content for adding commercials, metadata or added information to be displayed or used during display, contractual obligations (e.g., expiration dates and the like), etc. Much of the added information may be incorporated into headers for each data chunk.

In an exemplary embodiment, the titles may be pre-recorded into a chosen format for storage in the library storage system 201 to incorporate some or all of the added information and to reduce or otherwise eliminate post-processing when the title is requested and loaded into the disk array 207. One exemplary format for metadata is eXtensible Markup Language (XML), as exemplified by the MPEG-7 standard. In one configuration, one or more of the processors 205 include processing and recording capabilities for storing received content into the desired format. Alternatively, separate recording stations (not shown) are provided for converting content from third parties from given or standard formats into the desired format for consumption by the IBS system 109. In this manner, the data may be re-organized and supplemented with the additional information listed above and may further be pre-processed in RAID format including ECC information and then stored in a desired format. In this manner, when the processed data is loaded from the library storage system 201, stored in the disk array 207 and/or retrieved from the disk array 207 by user processes, additional processing is significantly minimized.

It is noted that each title stored in the library storage system 201 may be associated with a corresponding bandwidth or data rate depending upon the type of data stored. In this manner, the IBS system 109 handles variable content with data rates variable between less than 1 Mbps to greater than 20 Mbps at any given time. Also, each component in the IBS system 109 has a predetermined maximum bandwidth capability that should not be exceeded at any given time. For example, the backbone switch 203 and each of the processors 205 have a given maximum bandwidth associated therewith. Since the data being processed has variable data rates, it is possible that the data stacks together at one point in the system causing an overload or bottleneck. The random or pseudo random storage of data from the library storage system 201 into the disk array 207 should alleviate the bandwidth stacking problem, although the problem may not be completely solved using random algorithms.

The management function centrally executed at the management processor 210 or distributed among the processors 205 manages the bandwidth to avoid bandwidth stacking and potential throughput bottleneck that may cause an overload condition. In one embodiment, the management function tracks bandwidth usage at each component and further tracks the additional bandwidth associated with each requested title. As each title request is made, the management function compares the current and additional bandwidth required to add the new title and compares the new bandwidth requirement with the maximum bandwidth parameters at any given point. Such bandwidth tracking also accounts for bandwidth needs over time to avoid or otherwise minimize bandwidth usage peaks that may potentially exceed the maximum bandwidth parameters. In one embodiment, the management function employs a latency or delay increment to avoid potential overload conditions. In this manner, if the management function identifies an overload condition, the new title request is not launched immediately and the management re-calculates bandwidth usage after adding the delay increment. If an overload condition would still occur, the management function continues to re-calculate using additional delay increments until any determined overload conditions are eliminated or otherwise minimized. In this manner, the new title is launched after a calculated number of delay increments to eliminate or minimize overload conditions. In one configuration, a new title may be delayed indefinitely if excessive bandwidth cannot be avoided. Alternatively, after bandwidth usage peaks are minimized after a certain delay, the management function anticipates all excessive overload conditions and re-allocates bandwidth to spread the processing over time and eliminate the overload conditions. For example, additional pre-processing may be performed or distributed processing may be employed to avoid the overload conditions.

Although the present invention has been described in detail with reference to certain embodiments including preferred versions thereof, other versions and variations are possible and contemplated. The present invention is intended to cover such alternatives, modifications, and equivalents, as can be reasonably included within the spirit and scope of the invention. Those skilled in the art should appreciate that they can readily use the disclosed conception and specific embodiments as a basis for designing or modifying other structures for carrying out the same purposes of the present invention without departing from the spirit and scope of the invention as defined by the appended claims.

The invention claimed is:

1. An interactive broadband server system, comprising:
    a plurality of processors, each having a port interface, a storage device interface, and a communication interface;
    a backbone switch including a plurality of ports, each of said plurality of ports coupled to a corresponding port interface of a corresponding one of said plurality of processors, wherein said backbone switch enables high speed communication between each of said plurality of processors;
    a plurality of storage devices coupled to and distributed across said plurality of processors, each said storage device having an interface coupled to a storage device interface of a corresponding one of said plurality of processors;
    wherein each of said plurality of processors is coupled between said backbone switch and said plurality of storage devices;
    said plurality of storage devices storing at least one title, each title divided into data chunks that are distributed across two or more of said plurality of storage devices; and
    a plurality user processes, each for execution on a corresponding one of said plurality of processors for interfacing a corresponding one of a plurality of subscriber locations via a corresponding communication interface, each user process operative to retrieve a requested title from two or more of said plurality of processors via said backbone switch and to assemble said requested title for delivery to a requesting subscriber location.

2. The interactive broadband server system of claim 1, wherein said plurality of storage devices are organized into a plurality of RAID groups, and wherein data chunks of each stored title are distributed across said plurality of RAID groups.

3. The interactive broadband server system of claim 2, wherein each data chunk is further divided into a plurality of sub-chunks that are distributed across one of the plurality of RAID groups.

4. The interactive broadband server system of claim 2, wherein RAID group retrieval and assembly functionality is distributed among said plurality of user processes.

5. The interactive broadband server system of claim 1, wherein each said user process is operative, via said backbone switch, to forward a request of a title and to receive a title map specifying locations of data chunks of said requested title, and to use said title map to retrieve said data chunks from said plurality of storage devices via said backbone switch.

6. The interactive broadband server system of claim 5, wherein each said title map defines where each data chunk of a title is stored in said plurality of storage devices.

7. The interactive broadband server system of claim 1, further comprising:
    at least one storage source for storing at least one title; and
    at least one loading process executed on at least one of said plurality of processors, each said loading process configured to retrieve a title from said at least one storage source, to divide said title into data chunks, and to distribute said data chunks across said plurality of storage devices via at least two of said plurality of processors and said backbone switch.

8. The interactive broadband server system of claim 1, further comprising:
    at least one retrieval process, each said retrieval process executed on a corresponding one of said plurality of processors, each said retrieval process configured to retrieve said data chunks from said plurality of storage devices of a title requested by another processor and to forward retrieved data chunks to a requesting user process executing on said another processor.

9. The interactive broadband server system of claim 7, further comprising:
    at least one of said plurality of processors executing a directory process that includes a master directory which further includes a title map for each title stored in said plurality of storage devices, each included title map locating each data chunk of a corresponding title.

10. The interactive broadband server system of claim 9, further comprising:
    said directory process operative to receive title requests from any of said plurality of user processes, to allocate storage space in said plurality of storage devices, to create a corresponding title map, to invoke a loading process to transfer a copy of said requested title from said at least one storage source to said plurality of storage devices, and to forward title maps to any of said plurality of user processes; and
    said loading process storing each said data chunk according to a corresponding title map.

11. The interactive broadband server system of claim 9, wherein said directory process employs a least recently used (LRU) policy when allocating storage space in said plurality of storage devices.

12. The interactive broadband server system of claim 9, wherein said plurality of storage devices are organized into a plurality of RAID groups, and wherein data chunks of each stored title are evenly distributed across said plurality of RAID groups.

13. The interactive broadband server system of claim 7, wherein said at least one storage source comprises a plurality of media readers, each coupled to a corresponding one of said plurality of processors and configured to receive a storage media storing at least one title.

14. The interactive broadband server system of claim 13, wherein each of said plurality of media readers comprises an optical disk drive.

15. The interactive broadband server system of claim 13, wherein said at least one storage source comprises a library storage system, which includes a plurality of storage media for storing a plurality of titles, said library storage system configured to receive title requests via said backbone switch and to load a corresponding storage media on any of said plurality of media readers.

16. The interactive broadband server system of claim 13, wherein each of said plurality of processors comprises a personal computer (PC) system with PC components including a first peripheral interface that couples to at least one of said plurality of storage devices, a second peripheral interface that couples to one of said plurality of media readers, a third peripheral interface that couples to a port of said backbone switch, and a fourth peripheral interface for interfacing at least one of said plurality of subscriber locations.

17. The interactive broadband server system of claim 1, wherein said plurality of processors includes a management processor that operates an operations support system and a business support system.

18. The interactive broadband server system of claim 1, wherein said backbone switch comprises an Ethernet switch.

19. The interactive broadband server system of claim 1, wherein at least one title is preprocessed and stored in a predetermined format to reduce loading and processing overhead.

20. The interactive broadband server system of claim 19, wherein said at least one title is pre-encrypted, includes pre-calculated redundancy information, and incorporates transport protocol.

21. The interactive broadband server system of claim 1, wherein at least one of a plurality of processes executed on one processor is shadowed on another processor.

22. The interactive broadband server system of claim 21, wherein each of said plurality of processors generates a heartbeat signal to a shadowing processor.

23. The interactive broadband server system of claim 22, wherein each said heartbeat signal is a numeric value which indicates a position of a master process in a title being delivered to a subscriber location and serves as a heartbeat and status indicator.

24. The interactive broadband server system of claim 21, further comprising an output switch having a first port coupled to an output of a first processor, a second port for interfacing a first subscriber location supported by said first processor, a third port coupled to an output of a second processor shadowing said first processor, and a fourth port for interfacing a second subscriber location supported by said second processor.

25. An interactive broadband server system, comprising:
a backbone switch including a plurality of bi-directional ports;
a disk array comprising a plurality of disk drives, said disk array storing a plurality of titles sub-divided into a plurality of data chunks which are distributed across said disk array;
a plurality of processors, each having a plurality of interfaces including a first interface coupled to a port of said backbone switch, a second interface coupled to at least one disk drive of said drive array, and a third interface for coupling to a network for interfacing a plurality of subscriber devices;
wherein each of said plurality of processors is coupled between said backbone switch and said disk array; and
a plurality of processes for execution on said plurality of processors, said plurality of processes enabling each processor to retrieve a plurality of data chunks of a requested title from two or more of said plurality of processors, to assemble said requested title, and to transmit said requested title via said third interface.

26. The interactive broadband server system of claim 25, wherein said disk array is organized into a plurality of RAID groups, and wherein said data chunks of each stored title are distributed across said plurality of RAID groups.

27. The interactive broadband server system of claim 26, wherein each RAID group comprises a plurality of disk drives each coupled to a different one of said plurality of processors.

28. The interactive broadband server system of claim 27, wherein each data chunk is further divided into a plurality of sub-chunks in which each sub-chunk is stored on a separate disk drive of a RAID group.

29. The interactive broadband server system of claim 25, wherein a plurality of titles each comprise isochronous data content simultaneously delivered to a corresponding plurality of subscriber devices via corresponding third interfaces of said plurality of processors.

30. The interactive broadband server system of claim 25, further comprising:
a plurality of media readers;
said plurality of interfaces of each of said plurality of processors further comprising a fourth interface coupled to one of said plurality of media readers; and
a library storage system, coupled to a port of said backbone switch, said library storage system including a plurality of storage media that collectively store a plurality of titles, said library storage system configured to receive a title request via said backbone switch and to load a corresponding storage media on any available one of said plurality of media readers.

31. The interactive broadband server system of claim 30, wherein said plurality of processes includes at least one loading process configured to retrieve a title from a media reader, to divide said title into data chunks, and to distribute said data chunks across said disk array via said plurality of processors.

32. The interactive broadband server system of claim 31, wherein said loading process further creates a title map that locates each data chunk of said title.

33. The interactive broadband server system of claim 32, wherein said plurality of processes includes at least one user process executed on a processor that retrieves said title map and that uses said title map to retrieve each data chunk of said title.

34. The interactive broadband server system of claim 25, wherein at least one title is preprocessed and stored in a predetermined format to reduce loading and processing overhead.

35. The interactive broadband server system of claim 34, wherein said at least one title is pre-encrypted.

36. The interactive broadband server system of claim 34, wherein said at least one title incorporates pre-calculated redundancy information.

37. The interactive broadband server system of claim 34, wherein said at least one title incorporates pre-stored transport protocol.

38. The interactive broadband server system of claim 34, wherein said at least one title incorporates a plurality of pointers to specific locations within stored title content.

39. The interactive broadband server system of claim 38, wherein said plurality of pointers includes a plurality of time stamps.

40. An interactive content engine, comprising:
   a backbone switch including a plurality of ports;
   a plurality of processors, each coupled to said backbone switch via one of said plurality of ports;
   a plurality of media readers, each coupled to a corresponding one of said plurality of processors;
   a library storage system, coupled to a port of said backbone switch, said library storage system including a plurality of storage media that collectively store a plurality of titles, said library storage system configured to receive a title request from a processor and to load a corresponding storage media on any available one of said plurality of media readers; and
   a plurality of storage devices distributed among said plurality of processors;
   wherein each of said plurality of processors is coupled between said backbone switch and said plurality of storage devices;
   and at least one process executed on said plurality of processors that collectively submits a title request, retrieves a requested title from said available media reader, stores said requested title in said plurality of storage devices, and delivers said requested title to one of said plurality of processors.

41. The interactive content engine of claim 40, wherein said plurality of processes comprises:
   at least one loading process that forwards said title request to said library storage system, that retrieves said requested title from a media reader, that divides said requested title into data chunks, that stores said data chunks into said plurality of storage devices via said plurality of processors, and that creates a title map that locates each data chunk of said requested title; and
   at least one user process that retrieves said title map and that uses said title map to retrieve each data chunk of said requested title.

* * * * *